US011308641B1

(12) United States Patent
Porta et al.

(10) Patent No.: US 11,308,641 B1
(45) Date of Patent: Apr. 19, 2022

(54) ONCOMING CAR DETECTION USING LATERAL EMIRROR CAMERAS

(71) Applicant: Ambarella International LP, Santa Clara, CA (US)

(72) Inventors: Pier Paolo Porta, Fidenza (IT); Shimon Pertsel, Mountain View, CA (US)

(73) Assignee: Ambarella International LP, Santa Clara, CA (US)

( * ) Notice: Subject to any disclaimer, the term of this patent is extended or adjusted under 35 U.S.C. 154(b) by 193 days.

(21) Appl. No.: 16/722,131

(22) Filed: Dec. 20, 2019

(51) Int. Cl.
| | |
|---|---|
| *G06K 9/00* | (2006.01) |
| *H04N 7/00* | (2011.01) |
| *G06T 7/73* | (2017.01) |
| *G06T 7/593* | (2017.01) |
| *G06T 7/292* | (2017.01) |
| *G06T 7/60* | (2017.01) |
| *B60R 1/06* | (2006.01) |
| *B60R 1/04* | (2006.01) |
| *B60R 11/04* | (2006.01) |
| *B60R 11/00* | (2006.01) |

(52) U.S. Cl.
CPC .................. *G06T 7/74* (2017.01); *B60R 1/04* (2013.01); *B60R 1/06* (2013.01); *B60R 11/04* (2013.01); *G06T 7/292* (2017.01); *G06T 7/593* (2017.01); *G06T 7/60* (2013.01); *B60R 2011/004* (2013.01); *B60R 2300/105* (2013.01); *B60R 2300/20* (2013.01); *G06T 2207/10016* (2013.01); *G06T 2207/10028* (2013.01); *G06T 2207/20081* (2013.01); *G06T 2207/30261* (2013.01)

(58) Field of Classification Search
USPC ........ 382/100, 103–107, 154, 162, 172–173, 382/181, 199, 209, 219, 224, 232, 254, 382/276, 286–291, 305, 312; 348/36
See application file for complete search history.

(56) References Cited

U.S. PATENT DOCUMENTS

| | | | | |
|---|---|---|---|---|
| 10,099,615 | B2 * | 10/2018 | Cerri | B60R 1/12 |
| 2012/0287232 | A1 * | 11/2012 | Natroshvili | G06T 7/33 |
| | | | | 348/36 |
| 2020/0112657 | A1 * | 4/2020 | Stein | G01C 11/06 |
| 2020/0231097 | A1 * | 7/2020 | Hayashida | B60R 11/0235 |
| 2020/0406834 | A1 * | 12/2020 | Russell | B60R 1/12 |
| 2021/0024000 | A1 * | 1/2021 | Peterson | G06T 11/60 |

\* cited by examiner

*Primary Examiner* — Seyed H Azarian

(74) *Attorney, Agent, or Firm* — Christopher P. Maiorana, PC

(57) ABSTRACT

An apparatus including an interface and a processor. The interface may be configured to receive first video frames of a first field of view captured by a first capture device and second video frames of a second field of view captured by a second capture device. The first capture device and the second capture device may have a symmetrical orientation with respect to a vehicle. The fields of view may have an overlapping region. The processor may be configured to select the capture devices to operate as a stereo pair of cameras based on the symmetrical orientation, receive the video frames from the interface, detect an object located in the overlapping region, perform a comparison operation on the object based on the symmetrical orientation with respect to the video frames and determine a distance of the object from the vehicle in response to the comparison operation.

19 Claims, 12 Drawing Sheets

ONCOMING CAR DETECTION USING LATERAL EMIRROR CAMERAS

FIELD OF THE INVENTION

The invention relates to computer vision generally and, more particularly, to a method and/or apparatus for implementing oncoming car detection using lateral emirror cameras.

BACKGROUND

The automotive market is experiencing an ongoing increase in safety related requirements. Increased safety requirements are driven both by consumer preferences, as well as regulatory mandates. For instance, the European New Car Assessment Programme (EURO NCAP) regulations continually raise the amount of passive and active safety features that automotive original equipment manufacturers (OEMs) are required to incorporate in a vehicle in order to qualify for the coveted 5-star safety rating. In response, manufacturers are installing an increasing amount of sensors (i.e., cameras, ultra-sonics and radars) on the vehicle. Adding more sensors raises the costs of a vehicle.

Similarly, there is a trend of adding higher levels of autonomous control that is gaining momentum (i.e., GM Supercruise, Tesla Autopilot, Nissan Propilot, etc.). Higher levels of autonomy also utilize numerous sensors. To enable the safety features, higher levels of autonomy and other features in vehicles to enhance the driving experience, there has been an increasing proliferation of viewing cameras, such as electronic mirror and surround view cameras. Often the viewing camera systems come equipped with integrated sensing capabilities (i.e., blind spot detection or parking assist).

It would be desirable to implement oncoming car detection using lateral emirror cameras.

SUMMARY

The invention concerns an apparatus including an interface and a processor. The interface may be configured to receive a first plurality of video frames of a first field of view captured by a first capture device and a second plurality of video frames of a second field of view captured by a second capture device. The first capture device and the second capture device may have a symmetrical orientation with respect to a vehicle. The first field of view and the second field of view may have an overlapping region behind the vehicle. The processor may be configured to select the first capture device and the second capture device to operate as a stereo pair of cameras based on the symmetrical orientation, receive the first plurality of video frames and the second plurality of video frames from the interface, detect an object located in the overlapping region, perform a comparison operation on the object based on the symmetrical orientation with respect to the first plurality of video frames and the second plurality of video frames and determine a distance of the object from the vehicle in response to the comparison operation.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
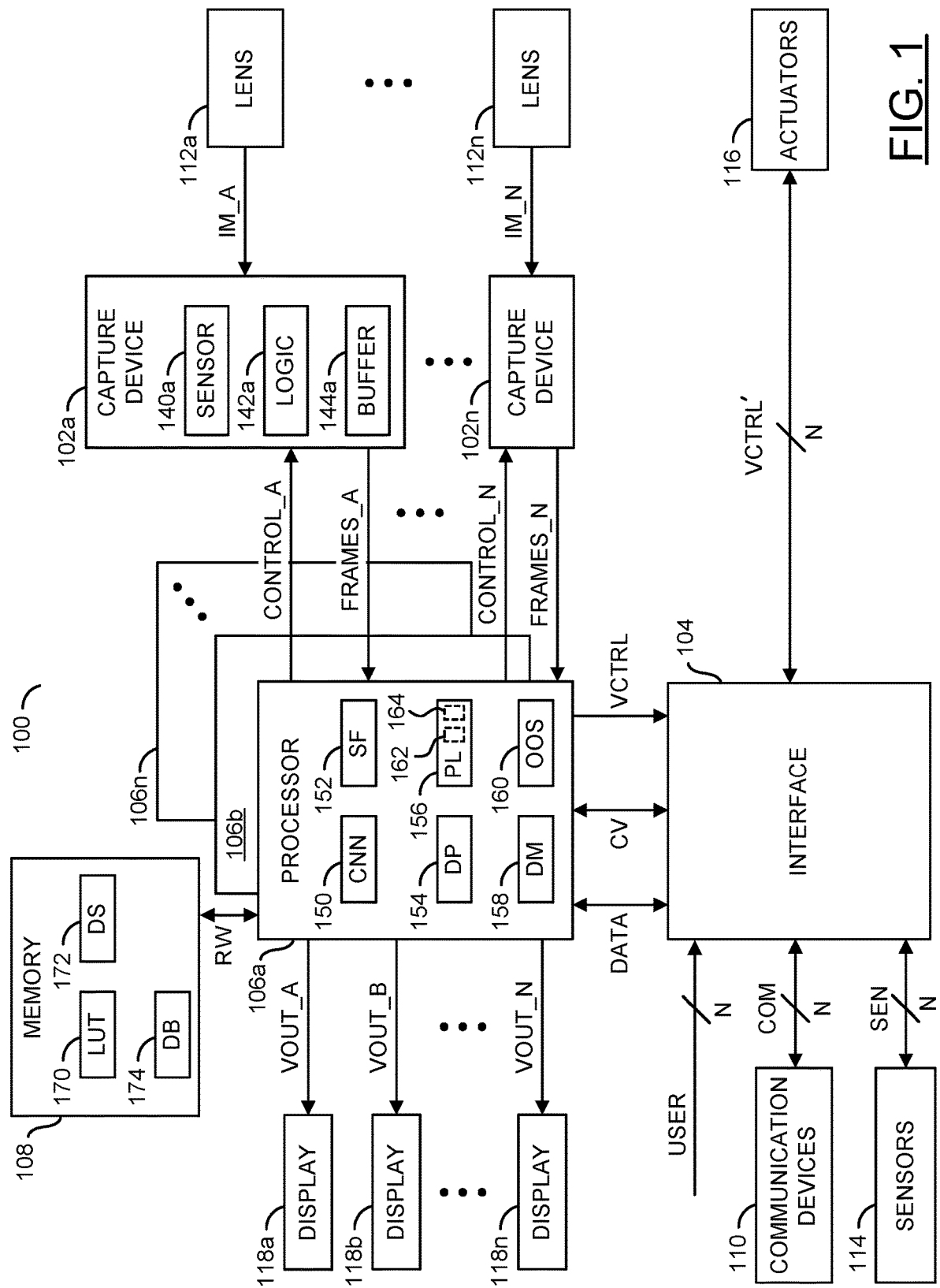
FIG. 1 is a diagram illustrating an embodiment of the present invention.

Embodiments of the present invention include providing oncoming car detection using lateral emirror cameras that may (i) utilize existing equipment installed on a vehicle, (ii) determine a distance to another vehicle, (iii) determine a speed of another vehicle, (iv) use a symmetrical orientation of vehicle cameras to estimate a distance, (v) implement a virtual stereo camera, (vi) measure a width of another vehicle, (vii) use information gathered from multiple cameras to measure distance and speed using a monocular camera system and/or (viii) be implemented as one or more integrated circuits.

Embodiments of the present invention may be configured to utilize existing sensors installed on a vehicle to estimate distances to other vehicles. Utilizing existing installed sensors may enable additional functionality without affecting cost and/or complexity. In an example, the sensors installed to enable an electronic mirror and back-up cameras (e.g., a native functionality) may be re-used to implement the additional functionality of the present invention. By re-using hardware that will already be installed on a vehicle, the additional functionality of distance detection may be implemented without installing additional sensors such as a rear radar and/or may provide redundancy for sensor systems that detect distance to objects.

Embodiments of the present invention may utilize camera sensors that are symmetrically oriented on the vehicle and provide an overlapping field of view as a virtual stereo camera. In an example, the left and right cameras that are already implemented on vehicles for electronic mirrors may be symmetrically oriented (e.g., located across from each other on the driver side and the passenger side). For the left and right cameras for electronic mirrors, there may be an overlap in field of view at a particular distance behind the ego vehicle (e.g., approximately 15 m or more).

A disparity engine may be implemented. The disparity engine may be a built-in component of processors configured to implement computer vision using images captured by stereo cameras. Using the virtual stereo cameras (e.g., the rear-facing left and right cameras for electronic mirrors), the disparity engine may be configured to accurately estimate distance of other objects to the rear of the ego vehicle. The disparity engine may be further configured to determine a relative velocity between the ego vehicle and another object. Based on the exact distance determined by the disparity engine, a physical width of the object may be determined.

When objects are too close to the ego vehicle to be reliably measured using the virtual stereo cameras (e.g., closer to the ego vehicle than the overlapping area), embodiments of the present invention may use the previously acquired physical width measurement to estimate the distance and/or relative velocity of the object using a monocular camera. In one example, the rear center electronic mirror camera may be used to provide the monocular view. Other rear facing cameras may also be utilized when the object is too close for the left and right electronic mirror cameras to be used as a virtual stereo pair.

Combining the use of the virtual stereo pair of cameras at larger distances and the monocular view at closer distances (e.g., distances closer than the distance that the fields of view of the virtual stereo pair of cameras start to overlap), embodiments of the present invention may provide sufficient information to detect potential collisions (e.g., rear collision threats). By leveraging sensor hardware that will already be implemented on vehicles for other (e.g., native) functionality, embodiments of the invention may provide additional functionality and/or redundancy. Using the knowledge of the width of the objects acquired by the virtual stereo pair of cameras, a distance result may be determined using only a monocular camera at closer ranges that may be more accurate and/or use less computer resources (e.g., lower power consumption, faster calculation time, etc.) than distance results calculated using a monocular view with artificial intelligence.

Referring to FIG. 1, a diagram illustrating an embodiment of the present invention 100 is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116 and/or blocks (or circuits) 118a-118n. The circuits 102a-102n may each implement a capture device. The circuits 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuits 118a-118n may each implement a display. The apparatus 100 may comprise other components (not shown). The number, type and/or arrangement of the components of the apparatus 100 may be varied according to the design criteria of a particular implementation.

In various embodiments of the apparatus 100, the components 102a-118n may be implemented as a distributed camera system 100. In the distributed system embodiment of the apparatus 100, each component may be implemented separately throughout an installation location (e.g., such as a vehicle). In some embodiments of the apparatus 100, the components 102a-118n may be implemented on a printed circuit board (e.g., a single module). In the single module embodiment, each component may be connected to a single module (e.g., such as a circuit board on a small device such as a drone). In some embodiments, some of the components 102a-118n may be implemented on a single module and some of the components 102a-118n may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle). In some embodiments, one or more of the components 102a-118n may be components separate from the apparatus 100 that may be accessed by the interface 104 and/or the processors 106a-106n.

In some embodiments, the apparatus 100 may implement one of the processors 106a-106n. In some embodiments, the apparatus 100 may implement multiple processors 106a-106n. For example, the processors 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, the one or more of the components 102a-118n may be implemented as part of another one of the components 102a-118n. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, lenses 112a-112n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., one of the displays 118a-118n).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to receive a respective one of the signals IM_A-IM_N, a respective signal (e.g., CONTROL_A-CONTROL_N) and/or present a respective signal (e.g., FRAMES_A-FRAMES_N).

The capture devices 102a-102n may each be configured to generate images and/or video frames in response to the signals IM_A-IM_N (e.g., perform an analog to digital conversion). The capture devices 102a-102n may capture data received through the lenses 112a-112n to generate video image data (e.g., generate video frames). The signals FRAMES_A-FRAMES_N may comprise video frames and/or images generated by the capture devices 102a-102n (e.g., video data). In some embodiments, the capture devices 102a-102n may be configured to perform depth sensing (e.g., the signals FRAMES_A-FRAMES_N may comprise depth information and/or vector light data in addition to the video frames). In one example, the capture devices 102a-102n may perform depth sensing using stereo cameras (e.g., cameras configured as a stereo pair to capture a depth map). In another example, the capture devices 102a-102n may perform depth sensing using time-of-flight. In yet another example, the capture devices 102a-102n may perform depth sensing using structured light. The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The interface 104 may comprise a data bus, traces, connectors, wires and/or pins. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement a convolutional neural network (CNN) module. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The modules 150-160 may each be implemented as dedicated hardware modules of the processors 106a-106n. The number, type and/or arrangement of the components of the processors 106a-106n may be varied according to the design criteria of a particular implementation.

The processors 106a-106n may be configured to execute computer readable code and/or process information. The processors 106a-106n may each be configured to receive the signals FRAMES_A-FRAMES_N, transmit the signal VCTRL, signals (e.g., VOUT_A-VOUT_N) and/or send/receive the signal DATA, the signal CV and/or a signal (e.g., RW). The signals VOUT_A-VOUT_N may each provide a video data output to a corresponding one of the displays 118a-118n. For example the processors 106a-106n may be configured to generate the video data (e.g., VOUT_A-VOUT_N) for the displays 118a-118n in response to the video frames (e.g., FRAMES_A-FRAMES_N). The signal RW may communicate data to/from the memory 108. The signal VOUT_A-VOUT_N, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown). The number and/or type of signals communicated by the processor 106a-106n may be varied according to the design criteria of a particular implementation.

The memory 108 may comprise a block (or circuit) 170, a block (or circuit) 172 and/or a block (or circuit) 174. The block 170 may implement a look up table. The block 172 may implement data storage. The block 174 may implement database storage (e.g., image feature sets, vehicle status, view options, GNSS/GPS positions, a schedule of a user, driver behavior, expected travel times/routes, user preferences, etc.). The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. In some embodiments, the memory 108 may be implemented as part of a black box recorder implemented to survive collisions (e.g., to preserve data to assist in an investigation). The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a LIDAR device, an array of LIDAR devices, an ultra-sound device, an array of ultra-sound devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, engage/disengage locks, adjust heating/cooling control settings, adjust fan speed, adjust heated seats, etc. The actuators 116 may control various components of the host vehicle. The number, type and/or functionality of the actuators 116 may be varied according to the design criteria of a particular implementation.

The displays 118a-118n may each implement a screen and/or an output device. In one example, one or more of the displays 118a-118n may implement an electronic mirror (e.g., an e-mirror). In another example, one or more of the displays 118a-118n may implement a touchscreen for an infotainment system. In yet another example, one or more of the displays 118a-118n may implement a back-up camera and/or bird's-eye view camera. The displays 118a-118n may display a version of video frames captured by one or more of the lenses 112a-112n and/or the capture devices 102a-102n. The video frames captured by the capture device 102a-102n may be cropped, adjusted and/or encoded by the processors 106a-106n to fit the displays 118a-118n. For example, the processor 106a-106n may provide real-time video streaming to the displays 118a-118n via the signals VOUT_A-VOUT_N.

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The logic 142a may transform the bitstream into a human-legible content (e.g., video data and/or video frames). For example, the logic 142a may receive pure (e.g., raw) data from the camera sensor 140a and generate video data based on the raw data (e.g., the bitstream). The logic 142a may further control the lens 112a in response to the signal CONTROL_A. The memory buffer 144a may store the raw data and/or the processed bitstream. For example, the frame memory and/or buffer 144a may store (e.g., provide temporary storage and/or cache) one or more of the video frames (e.g., the video signal). In some embodiments, each of the capture devices 102a-102n may comprise other components (e.g., a battery, a motor, a microphone, etc.).

In some embodiments, the sensor 140a may implement an RGB-InfraRed (RGB-IR) sensor. The sensor 140a may comprise a filter array comprising a red filter, a green filter, a blue filter and a near-infrared (NIR) wavelength filter (e.g., similar to a Bayer Color Filter Array with one green filter substituted with the NIR filter). The sensor 140a may operate as a standard color sensor and a NIR sensor. Operating as a standard color sensor and NIR sensor may enable the sensor 140a to operate in various light conditions (e.g., day time and night time).

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection.

The CNN module 150 may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 150 to find the most probable correspondences between feature points in a reference frame and a target frame. In a process to match pairs of reference and target feature points, each feature point may be represented by a descriptor (e.g., image patch, SIFT, BRIEF, ORB, FREAK, etc.). Implementing the CNN module 150 using dedicated hardware circuitry may enable calculating descriptor matching distances in real time.

The CNN module 150 may be a dedicated hardware module configured to perform feature detection of the video frames. The features detected by the CNN module 150 may be used to calculate descriptors. The CNN module 150 may determine a likelihood that pixels in the video frames belong to a particular object and/or objects in response to the descriptors. For example, using the descriptors, the CNN module 150 may determine a likelihood that pixels correspond to a particular object (e.g., a person, a vehicle, a car seat, a tree, etc.) and/or characteristics of the object (e.g., a mouth of a person, a hand of a person, headlights of a vehicle, a branch of a tree, a seatbelt of a seat, etc.). Implementing the CNN module 150 as a dedicated hardware module of the processors 106a-106n may enable the apparatus 100 to perform the computer vision operations locally (e.g., on-chip) without relying on processing capabilities of a remote device (e.g., communicating data to a cloud computing service).

The computer vision operations performed by the CNN module 150 may be configured to perform the feature detection on the video frames in order to generate the descriptors. The CNN module 150 may perform the object detection to determine regions of the video frame that have a high likelihood of matching the particular object. In one example, the types of object to match against (e.g., reference objects) may be customized using the open operand stack module 160. The CNN module 150 may be configured to perform local masking to the region with the high likelihood of matching the particular object(s) to detect the object.

The sensor fusion module 152 may be configured to analyze information from multiple sensors 114, capture devices 102a-102n and/or the database 174 for redundancy. By analyzing various data from disparate sources, the sensor fusion module 152 may be capable of making inferences about the data that may not be possible from one of the data sources alone. For example, the sensor fusion module 152 may analyze video data as well as radar, LIDAR, inertial, motion, V2X, location data (e.g., GPS, GNSS, ADAS, etc.), gaze direction, driver state, battery status and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by LIDAR for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing (e.g., electronic image stabilization (EIS)), downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline 156 may enable 4K ultra high resolution with H.264 encoding at double real time speed (e.g., 60 fps), 4K ultra high resolution with H.265/HEVC at 30 fps, 4K AVC encoding and/or other types of encoding (e.g., VP8, VP9, AV1, etc.). The video data generated by the video pipeline module 156 may be compressed (e.g., using a lossless compression and/or a low amount of lossiness). The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the displays 118a-118n (e.g., the signal VOUT_A-VOUT_N).

The video pipeline module 156 may implement scheduling. Scheduling may enable the video pipeline 156 to perform various discrete, asynchronous video operations and/or computer vision operations in parallel. The scheduling may enable data results from one video operation to be available by the time another video data operation needs the data results.

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The decision making module 158 may be further configured to determine the video data to communicate to the displays 118*a*-118*n*. The signals VOUT_A-VOUT_N may be cropped and/or adjusted in response to decisions by the decision making module 158. For example, the decision module 158 may select one field of view (e.g., a wide angle field of view) instead of another field of view (e.g., a narrow angle field of view) to send to the display 118*a* as the signal VOUT_A. In another example, the decision making module 158 may determine which of the displays 118*a*-118*n* to use to display a notification (e.g., an advertisement) and/or where on the video data to place the notification. In yet another example, the decision making module 158 may adjust output characteristics of the displays 118*a*-118*n* (e.g., brightness, contrast, sharpness, etc.).

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The video processing pipeline 156 is shown comprising a block (or circuit) 162 and/or a block (or circuit) 164. The circuit 162 may implement a computer vision pipeline portion. The circuit 164 may implement a disparity engine. The video processing pipeline 156 may comprise other components (not shown). The number and/or type of components implemented by the video processing pipeline 156 may be varied according to the design criteria of a particular implementation.

The computer vision pipeline portion 162 may be configured to implement a computer vision algorithm in dedicated hardware. The computer vision pipeline portion 162 may implement a number of sub-modules designed to perform various calculations used to perform feature detection in images (e.g., video frames). Implementing sub-modules may enable the hardware used to perform each type of calculation to be optimized for speed and/or efficiency. For example, the sub-modules may implement a number of relatively simple operations that are used frequently in computer vision operations that, together, may enable the computer vision algorithm to be performed in real-time. The computer vision pipeline portion 162 may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

The disparity engine 164 may be configured to determine a distance based on images captured as a stereo pair. Two or more of the capture devices 102*a*-102*n* may be configured as a stereo pair of cameras. The capture devices 102*a*-102*n* configured as a stereo pair may be implemented close to each other at a pre-defined distance and/or have a symmetrical orientation about a central location. The capture devices 102*a*-102*n* configured as a stereo pair may be configured to capture video frames from similar, but slightly different perspectives (e.g., angled inwards to capture fields of view that overlap).

The disparity engine 164 may be configured to perform a comparison to analyze the differences between the stereo pair of images. In an example, the processors 106*a*-106*n* may detect feature points of the same object detected in both video frames captured by the capture devices 102*a*-102*n* configured as a stereo pair. The disparity engine 164 may determine distances (e.g., an offset) of the feature points and then perform calculations based on the characteristics of the stereo pair of capture devices (e.g., angle, distance apart, etc.) and the determined distances of the feature points. Based on the differences between the stereo pair of images and the pre-defined distance between the capture devices 102*a*-102*n* configured as a stereo pair, the disparity engine may be configured to determine a distance. The distance determined by the disparity engine 164 may be the distance from the capture devices 102*a*-102*n* configured as a stereo pair. In an example, the disparity engine 164 may determine a distance from the capture devices 102*a*-102*n* configured as a stereo pair to a particular object (e.g., a vehicle, a bicycle, a pedestrian, driver, a vehicle occupant, etc.) based on the comparison of the differences in the stereo pair of images captured.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

The database storage 174 may comprise information about user preferences for one or more users of a vehicle. In an example, different drivers may have different driving behaviors (e.g., time of day the driver travels, the usual routes the driver travels, camera view preferences, etc.). The database storage 174 may be comprise information about particular conditions associated with selecting particular camera views for display. The type of data stored about each driver and/or vehicle occupant in the database storage 174 may be varied according to the design criteria of a particular implementation.

The database storage 174 may comprise information about detected events. The decision module 158 may determine whether an event has occurred based on information from the CNN module 150 and/or the sensor fusion module 152. An event may be a scenario determined by the decision module 158 to be worth storing information about (e.g., a collision, an unknown object detected, a near miss, etc.). The database storage 174 may store metadata corresponding to the detected event. The metadata may comprise a location, a time-of-day timestamp, detected weather conditions, speed of the vehicles, acceleration of the vehicles, etc.). In some embodiments, the metadata may comprise a log of all the measurements of the sensors 114.

In some embodiments, the database storage 174 may comprise information about particular individuals. In an example, the database storage 174 may comprise information about faces for one or more people. The facial information may be used to perform facial recognition to identify a passenger as a particular person. In an example, the facial information may comprise descriptors and/or features corresponding to one or more individuals (e.g., the vehicle owner and the family members of the vehicle owner). The facial information stored in the database 174 may be used to enable the apparatus 100 to perform specific actions for specific people.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of a particular one of the displays 118a-118n by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the displays 118a-118n. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signals VOUT_A-VOUT_N may be encoded, cropped, stitched and/or enhanced versions of one or more of the signals FRAMES_A-FRAMES_N. The signals VOUT_A-VOUT_N may be high resolution, digital, encoded, de-warped, stabilized, cropped, downscaled, packetized, blended, stitched and/or rolling shutter effect corrected versions of the signals FRAMES_A-FRAMES_N. The enhanced versions of the signals FRAMES_A-FRAMES_N may improve upon the view captured by the lenses 112a-112n (e.g., provide night vision, provide High Dynamic Range (HDR) imaging, provide more viewing area, highlight detected objects, provide additional information such as numerical distances to detected objects, provide bounding boxes for detected objects, etc.).

The processors 106a-106n may be configured to implement intelligent vision processors. The intelligent vision processors 106a-106n may implement multi-object classification. In one example, multi-object classification may comprise detecting multiple objects in the same video frames using parallel processing that reduces power consumption and/or computational resources compared to detecting multiple objects one object at a time. The multi-object classification may further comprise determining multiple inferences at a time (e.g., compared to first detecting whether an object exists, then detecting that the object is a driver, then determining whether the driving is holding the steering wheel, etc.).

Figure 2:
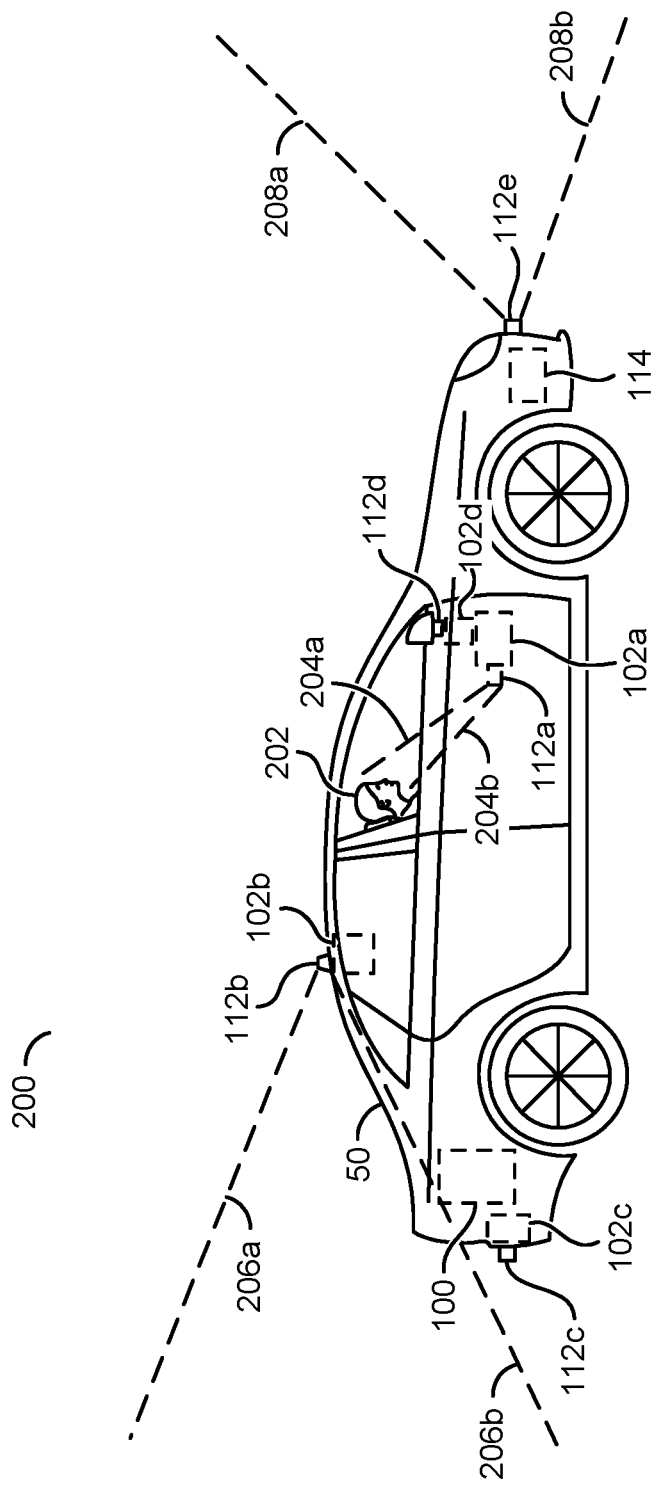
FIG. 2 is a diagram illustrating an example of camera systems inside and outside of a vehicle.

Referring to FIG. 2, a diagram illustrating an example embodiment 200 of camera systems inside and outside of a vehicle is shown. An automobile/vehicle 50 is shown. The apparatus 100 is shown as a component of the vehicle 50 (e.g., an ego vehicle). In the example shown, the ego vehicle 50 is a car. In some embodiments, the ego vehicle 50 may be a truck, an ATV, an airplane, a drone, etc. The type of the ego vehicle 50 implementing the apparatus 100 may be varied according to the design criteria of a particular implementation.

A driver 202 is shown seated in the ego vehicle 50. The vehicle sensors 114 are shown on (or in) the ego vehicle 50. The apparatus 100 is shown in the rear of the ego vehicle 50. In another example, the apparatus 100 may be distributed throughout the ego vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation.

A camera (e.g., the lens 112a and the capture device 102a) is shown capturing an interior of the ego vehicle 50 (e.g., detecting the driver 202). A targeted view of the driver 202 (e.g., represented by a line 204a and a line 204b) is shown being captured by the capture device 102a. The capture device 102a may also detect other objects in the ego vehicle 50 (e.g., a seat, a head rest, an arm rest, a rear window, a seatbelt, a center console, other occupants, etc.). By analyzing video of the driver 202 and/or other occupants of the ego vehicle 50 (e.g., extracting video data from the captured video), the processors 106a-106n may determine a body position and/or body characteristics (e.g., a distance, orientation and/or location of the body and/or head) of one or more occupants of the ego vehicle 50 and/or objects within the ego vehicle 50.

In some embodiments, more than one of the capture devices 102a-102n may be used to capture video data of the driver 202 and/or other occupants of the ego vehicle 50. A combination of inputs from the signals FRAMES_A-FRAMES_N may be used to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112c and the capture device 102c) is shown capturing a targeted view from the ego vehicle 50. In the example shown, the targeted view from the ego vehicle 50 (e.g., represented by a line 206a and a line 206b) is shown capturing an exterior view to the rear of (e.g., an area behind) the ego vehicle 50. Similarly, other cameras may be used to capture video data of a targeted view from the vehicle (e.g., shown as the lens 112c and the camera sensor 102c, the lens 112d and the camera sensor 102d, etc.). For example, the targeted view (e.g., represented by a line 208a and a line 208b) may provide a front exterior view of an area. The number of cameras implemented, a direction captured, an orientation of the cameras and/or an arrangement of the cameras may be varied according to the design criteria of a particular implementation.

The capture devices 102a-102n may be configured to capture video data of the environment around (e.g., area near) the ego vehicle 50. The processors 106a-106n may implement computer vision to detect objects and/or understand what is happening near the ego vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a LIDAR device, an array of LIDAR devices, an ultra-sound device, an array of ultra-sound devices, etc.

The sensor fusion module 152 may aggregate data from the sensors 114, the CNN module 150 and/or the video pipeline 156 to build a model and/or abstraction of the environment around the ego vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the ego vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

The processors 106a-106n may be configured to analyze the captured video signal. The processors 106a-106n may detect objects in the captured video signal of the exterior of a vehicle (e.g., automobiles, bicycles, pedestrians, animals, parking spaces, etc.) and/or of an interior of a vehicle (e.g., the driver 202, other occupants, physical characteristics of people in the vehicle, facial expressions of people in the vehicle, fields of view of the people in the vehicle, etc.). The processors 106a-106n may be configured to determine a presence, an absolute location and/or a relative location of the detected objects. Based on the detected objects, the processors 106a-106n may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106a-106n. For example, the data received may comprise external signals generated in response to user input, external signals generated by the sensors 114 and/or internally generated signals such as signals generated by the processors 106a-106n in response to analysis of the video data and/or objects detected in video data.

The processors 106a-106n may process video data that may not be seen by a person (e.g., not output to the displays 118a-118n). For example, the video data may be internal to the processors 106a-106n. Generally, the processors 106a-106n perform the computer vision operations in order to interpret the environment to emulate how a person would see the environment and/or provide greater sensory capability than a human. For example, the processors 106a-106n may interpret the environment in many directions at once (e.g., a 360 degree field of view) while a person has a limited field of view.

The video analytics performed by the processors 106a-106n may be performed on more than one video frame. For example, the processors 106a-106n may analyze a series (or sequence) of video frames. In some embodiment, the processors 106a-106n may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands), determine a vulnerability of an occupant (e.g., a non-moving occupant may be asleep and/or unconscious) and/or determine an expected path of a detected object (e.g., determine speed, acceleration and direction to determine a trajectory). The expected path may be further determined based on context such the type of object and/or the shape of the roadway (e.g., a vehicle with a straight trajectory will likely follow the curve of a roadway instead of continuing to drive straight off the road). In another example, tracking a static object across video frames temporally may be implemented to determine a status of an object. For example, the windshield may be tracked over time to determine that visibility has been reduced and/or increased (e.g., due to frost forming and/or disappearing).

In some embodiments, the processors 106a-106n may implement depth-sensing techniques. The depth-sensing techniques may compare knowledge of the dimensions of the ego vehicle 50 to the location and/or body position of the occupants. The processors 106a-106n may cross-reference a body position of the occupants with a location of the components of the vehicle (e.g., how far away the driver is from the steering wheel).

In some embodiments, the video analytics may process the captured video frames for biometric markers to determine a vulnerability of the occupants of the ego vehicle 50. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106a-106n may be configured to detect faces in a region of a video frame. In some embodiments, facial recognition may be implemented (e.g., based on faces stored as references in the memory 108 and/or an external database accessible by the communication devices 110). In some embodiments, the processors 106a-106n may be configured to detect objects and classify the objects as a particular type of object (e.g., an elderly person, a child, an animal, etc.).

The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106a-106n may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The computer vision operations may be performed on video frames received from the various capture devices 102a-102n. The capture devices 102a-102n may comprise various types of cameras (e.g., IR, depth measuring cameras such as stereo, time-of-flight and/or structured light cameras, Bayer cameras, RCCB, RCCC, etc.). The computer vision operations may be performed on the video frames FRAMES_A-FRAMES_N generated by various configurations of the capture devices 102a-102n. In one example, the computer vision operations may be performed based on video frames captured by a single camera. In another example, the computer vision operations may be performed based on video frames captured by multiple cameras configured to capture images of different locations. The sensor fusion module 152 may enable the computer vision operations to be supplemented by the user of the sensors 114 (e.g., radar, occupancy sensors, temperature sensors, location/orientation sensors, etc.). The type of capture devices implemented may be varied according to the design criteria of a particular implementation.

The memory 108 may store the pre-determined locations and/or a pre-determined field of view of each of the capture devices 102a-102n. The memory 108 may store reference data corresponding to the objects. For example, the memory 108 may store reference color histograms about various known types of objects. In another example, the memory 108 may store previously captured frames (e.g., a reference image from when the ego vehicle 50 was parked, when the ego vehicle 50 came out of production, a reference image from when a car was in operation, turned off, left unattended, etc.). The type of reference information stored by the memory 108 may be varied according to the design criteria of a particular implementation.

The CNN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the ego vehicle 50. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the ego vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics)

of the occupants of the ego vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to one of the displays 118a-118n (e.g., as a live stream for use in teleconferencing). The processors 106a-106n may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., a RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or the capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360 degree field of view, less than a 360 degree field of view, etc.).

In some embodiments, the processors 106a-106n may analyze reference video frames. Reference video frames may be used by the processors 106a-106n to classify, analyze and/or store reference objects. The reference objects may be used by the processors 106a-106n to compare with objects captured in newly acquired (e.g., current) video frames. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. In one example, a distance to an object may be determined by comparing a number of pixels occupied by a particular object in the reference frame to the number of pixels occupied by the object in the current video frame. The types of reference objects and/or characteristics of the reference objects may be varied according to the design criteria of a particular implementation.

In some embodiments, the processors 106a-106n may compare the current video frame to the reference video frame. In some embodiments, the current video frame may not be directly compared to the reference video frame. For example, the CNN module 150 may implement deep learning to gather information and/or statistics about various features of objects. The CNN module 150 may determine features of objects and/or sub-objects corresponding to the current video frame. The processors 106a-106n may compare the features extracted from the current video frame to features extracted from numerous reference video frames. For example, the reference video frame and/or the current video frame may be used as training data for the CNN module 150. The types of features extracted from video frames to perform the computer vision analysis may be varied according to the design criteria of a particular implementation.

Figure 3:
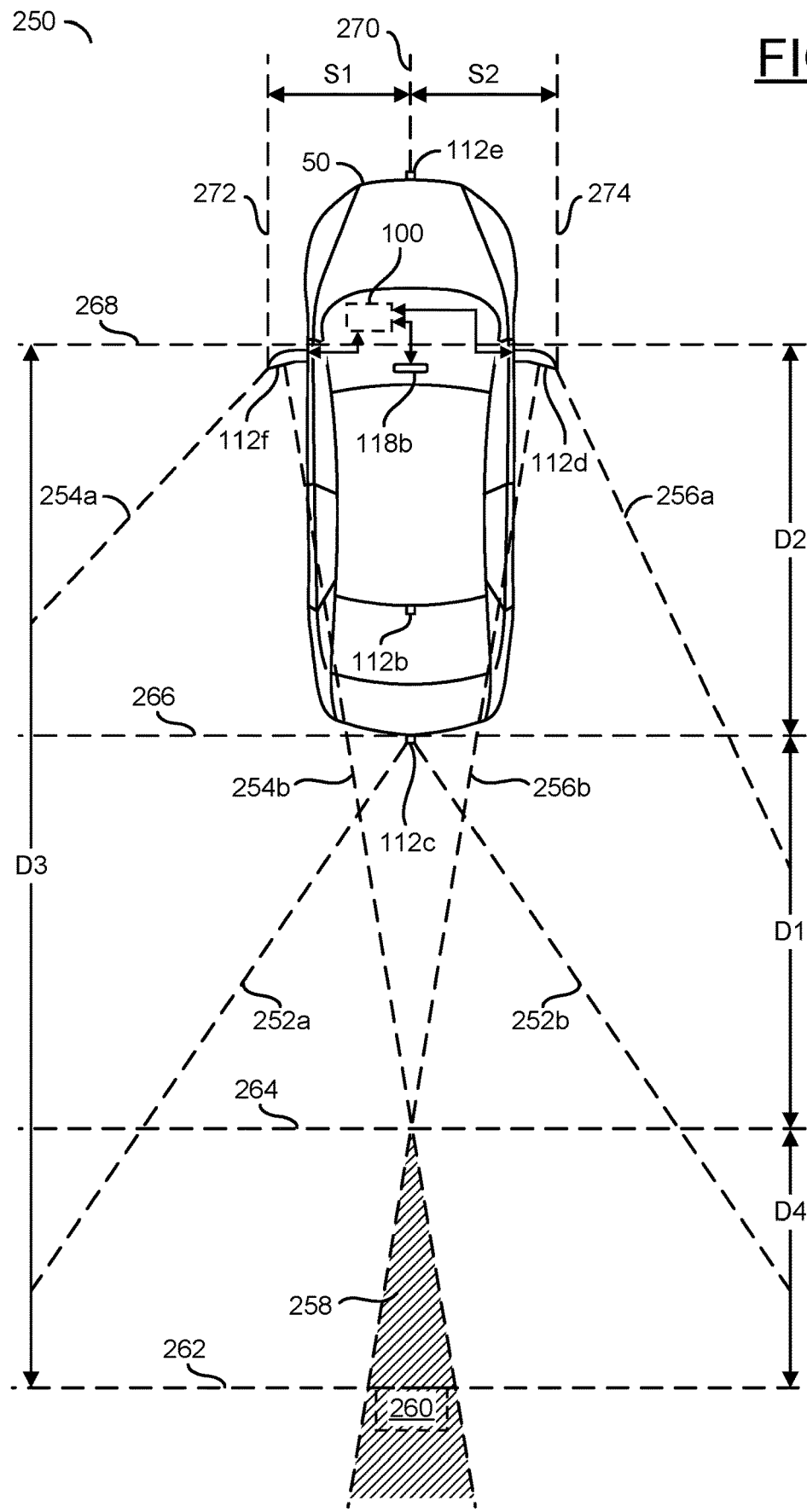
FIG. 3 is a diagram illustrating an overlapping region of symmetrical cameras and a rear camera.

Referring to FIG. 3, a diagram illustrating an overlapping region of symmetrical cameras is shown. An overhead view 250 of the ego vehicle 50 is shown. The apparatus 100 and the display 118b are shown within the ego vehicle 50. The lenses 112b-112f are shown located on the outside body of the ego vehicle 50. In the example shown, the lens 112c may capture video data from a rear center (e.g., bumper) of the ego vehicle 50, the lens 112d may capture video data from a passenger side of the ego vehicle 50 and the lens 112f may capture video data from a driver side of the ego vehicle 50.

Lines 252a-252b are shown extending from the lens 112c. The lines 252a-252b may represent a field of view of the rear camera lens 112c. Lines 254a-254b are shown extending from the lens 112f. The lines 254a-254b may represent a field of view of the driver side camera lens 112f. Lines 256a-256b are shown extending from the lens 112d. The lines 256a-256b may represent a field of view of the passenger side camera lens 112d. The field of view lines 252a-252b, 254a-254b and/or 256a-256b are shown for illustrative purposes. For example, the field of view lines 252a-252b, 254a-254b and/or 256a-256b may extend from the lenses 112c, 112d and/or 112f at a wider angle (e.g., the lenses 112c, 112d and/or 112f may be wide angle lenses). The arrangement of the lens 112c, the lens 112d and/or the lens 112f and/or the field of view 252a-252b, the field of view 254a-254b and/or the field of view 256a-256b may be varied according to the design criteria of a particular implementation.

The line 254b and the line 256b may overlap each other at a particular distance behind the ego vehicle 50. A shaded region 258 is shown. The shaded region 258 may represent the overlapping region. The overlapping region 258 may correspond to an area where a portion of the field of view 254a-254b of the driver side capture device 102f and a portion of the field of view 256a-256b of the passenger side capture device 102d overlap. A distance from the ego vehicle 50 to the overlapping region 258 may be pre-determined based on the angle, location and/or orientation of the capture device 102d and the capture device 102f.

A dotted box 260 is shown. The dotted box 260 may represent an object. In the example shown, the object 260 may be located behind the ego vehicle 50 and may be within the overlapping region 258. In one example, the object 260 may be another vehicle. In another example, the object 260 may be a pedestrian. In yet another example, the object 260 may be an animal. Generally, knowing the distance to the object 260 may be helpful to the driver 202 and/or the processors 106a-106n (e.g., for autonomous driving, enabling/disabling safety features, to perform automatic responses, etc.). The type, size, velocity and/or distance from the ego vehicle 50 of the object 260 may be varied according to the design criteria of a particular implementation.

A line 262 is shown. The line 262 may be a reference location. The reference location 262 is shown behind the ego vehicle 50 and may correspond to the location of the object 260. A line 264 is shown. The line 264 may be a reference location corresponding to the location of the start of the overlapping region 258. The line 266 is shown. The line 266 may be a reference location corresponding to the rear lens 112c. A line 268 is shown. The line 268 may be a reference location corresponding to the passenger side lens 112d and/or the driver side lens 112f.

A distance D1 is shown. The distance D1 may be a distance between the reference location 264 and the reference location 266. A distance D2 is shown. The distance D2 may be a distance between the reference location 266 and the reference location 268. A distance D3 is shown. The distance D3 may be a distance between the reference location 262 and the reference location 268. A distance D4 is shown. The distance D4 may be a distance between the reference location 262 and the reference location 264.

In the example shown, the distance D1 may be longer than the distance D2. In an example, there may be approximately a three meter distance between the location of the passenger/driver lenses (e.g., 112d and 112f) and the rear lens 112c. The distance D1 may be a pre-determined distance. In the example shown, the distance D1 may be a pre-determined distance behind the ego vehicle 50 to the overlapping region 258 that may be determined based on the angle and/or orientation of the lens 112d and the lens 112f. In an example, there may be approximately a fifteen meter distance between the rear of the ego vehicle 50 and where the overlapping region 258 begins (e.g., the field of view 254a-254b and the field of view 256a-256b start to overlap).

The distance D1 plus the distance D4 may be a distance to the object 260 from the rear of the ego vehicle 50. The distance D3 may be a distance from the capture device 102d and the capture device 102f to the object 260. The distance D1 may be a distance from the rear of the ego vehicle 50 to the start of the overlapping region 258.

From the reference location 268 to the reference location 266 (e.g., the distance D2) and from the reference location 266 to the reference location 264 (e.g., the distance D1), none of the field of view 254a-254n of the driver side capture device 102f and none of the field of view 256a-256n of the passenger side capture device 102d may overlap. After the reference point 264, a portion of the field of view 254a-254n of the driver side capture device 102f and a portion of the field of view 256a-256b of the passenger side capture device 102d may overlap (e.g., the overlapping region 258) and other portions of the field of view 254a-254b and the field of view 256a-256b may not overlap.

In the example shown, the object 260 is within the overlapping region 258. The object 260 may be captured by both the driver side capture device 102f and the passenger side 102d. If the object 260 moves closer to the ego vehicle 50 (e.g., within the distance D1), then the object 260 may be captured by the rear capture device 102c within the field of view 252a-252b (e.g., a monocular view).

A dotted line 270, a dotted line 272 and a dotted line 274 are shown. The dotted lines 270-274 may each be a reference location that corresponds to a location along a width of the ego vehicle 50. The dotted line 270 may correspond to a center line of the ego vehicle 50. The dotted line 270 may bisect the left and right half of the ego vehicle 50. The dotted line 272 may correspond to a location of the lens 112f on the driver side of the ego vehicle 50. The dotted line 274 may correspond to a location of the lens 112d on the passenger side of the ego vehicle 50.

A distance S1 and a distance S2 are shown. The distance S1 may correspond to a distance between the reference location 270 and the reference location 272. The distance S2 may correspond to a distance between the reference location 270 and the reference location 274. The distance S1 and the distance S2 may be equal values. The distance from the camera lens 112f to the centerline 270 of the ego vehicle 50 may be the same as the distance of the camera lens 112d to the centerline 270 of the ego vehicle 50. Since the distance S1 and the distance S2 are equal, the camera lens 112d and the camera lens 112f may be symmetrical about the centerline 270. The camera lens 112d and the camera lens 112f may both be an equal distance D2 from the rear of the ego vehicle 50 (e.g., the reference location 266). Being symmetrical about the ego vehicle 50 (e.g., the centerline 270) and being equal distances (e.g., D2) to the rear of the ego vehicle 50, the camera lens 112d and the camera lens 112f may have a symmetrical orientation. The symmetrical orientation of the capture device 102d and the capture device 102f may further comprise the lens 112d and the lens 112f directed at an angle inwards so that at least a portion of the respective fields of view cover the same area (e.g., to provide an overlapping region such as the overlapping region 258).

The camera lens 112d and the camera lens 112f may have a symmetrical orientation. Since the camera lens 112d and the camera lens 112f have a symmetrical orientation, the capture device 102d and the capture device 102f may be a symmetrical pair. The apparatus 100 may be configured to use the capture device 102d and the capture device 102f as a symmetrical pair of cameras. Using the capture device 102d and the capture 102f with the symmetrical orientation as a symmetric pair may create a virtual stereo pair of cameras (e.g., virtual stereo cameras 102d/102f). For example, the capture device 102d may be configured to capture monocular video frames of the field of view 256a-256b and the capture device 102f may be configured to capture monocular video frames of the field of view 254a-254b. However, when selected by the processors 106a-106n the capture device 102d and the capture device 102f the monocular video frames from the stereo pair of capture devices 102d/102f may be analyzed together as a stereo pair of video frames of the overlapping region 258.

In the example shown, the virtual stereo cameras 102d/102f may be directed to capture video data to the rear of the ego vehicle 50. In some embodiments, the virtual stereo cameras 102d/102f may be directed towards a front of the ego vehicle 50 to capture video data in front of the ego vehicle 50. The apparatus 100 may be configured to select any of the capture devices 102a-102n that have a symmetrical orientation to each other to operate as virtual stereo cameras. The particular capture devices used as virtual stereo cameras, the direction of capture of video data and/or the location of the capture devices on the ego vehicle 50 may be varied according to the design criteria of a particular implementation.

In the example shown, the virtual stereo cameras 102d/102f may be located on an outermost location of each side of the ego vehicle 50. The outermost location of each side of the ego vehicle 50 may stick out from the ego vehicle 50 (e.g., extend past the body of the ego vehicle 50). For example, the lens 112f is shown located on the driver side mirror (e.g., the outermost location on one side of the ego vehicle 50) and directed behind the ego vehicle 50 and the lens 112d is shown located on the passenger side mirror (e.g., the outermost location on another side of the ego vehicle 50) and directed behind the ego vehicle 50. The lens 112f and the lens 112d are both shown directed behind the ego vehicle 50 (e.g., pointed towards a rear of the ego vehicle 50). The overlapping region 258 is shown behind the ego vehicle 50.

The capture devices 102a-102n may be implemented on the ego vehicle 50 for various purposes and/or functionality. In an example, the capture device 112c, the capture device 112d and the capture device 112f may be implemented to enable the apparatus 100 to generate output video data (e.g., the signals VOUT_A-VOUT_N) for an electronic rear view mirror (e.g., the display 118b). The apparatus 100 may be configured to recognize which of the capture devices 102a-102n have a symmetrical orientation to create a virtual stereo pair of cameras. Because of the use of the capture device 102d and the capture device 102f as cameras for capturing video data for the electronic rear view mirror 118b, the capture device 102d and the capture device 102f may be installed on the ego vehicle 50 having the symmetrical orientation.

The processors 106a-106n may determine that the capture device 102d and the capture device 102f have the symmetrical orientation and create the virtual stereo cameras 102d/102f. The processors 106a-106n may use the virtual stereo cameras 102d/102f to perform comparison operations to determine the distance and/or velocity of the object 260 relative to the ego vehicle 50. The disparity engine 164 may be configured to use the characteristics of the virtual stereo pair of cameras 102d/102f and/or the relationship between the capture device 102d and the capture device 102f to perform calculations. The processors 106a-106n may further use the capture device 102d and the capture device 102f for additional (e.g., native) functionality. Selecting the stereo pair of cameras 102d/102f may add a secondary function to the native functionality. For example, the secondary function may be to determine the distance and/or velocity of the object 260.

In an example, the rear capture device 102c (e.g., corresponding to the rear lens 112c), the passenger capture device 102d (e.g., corresponding to the passenger lens 112d) and the driver capture device 102f (e.g., corresponding to the driver lens 112f) may each have the same focal length. In an example, the focal length may be 4.6 mm. If the object 260 located at the reference location 262 is captured by the rear lens 112c, the passenger lens 112d and the driver lens 112f, the object 260 may appear having different sizes in the captured video frames because of the distance D2 between the lenses. In an example of native functionality implemented by the processors 106a-106n, the processors 106a-106n (e.g., by performing video operations in the video pipeline 156) may scale down the rectilinear video frames (e.g., FRAMES_C) captured by the rear capture device 102c in order to make objects that appear across the different camera views (e.g., at a stitching seam) appear to have similar sizes. The processors 106a-106n may be configured to scale the images captured by each of the capture device 102c, the capture device 102d and the capture device 102f (e.g., native functionality) regardless of whether the apparatus 100 is configured to select the virtual stereo cameras 102d/102f.

The fields of view 252a-252b, 254a-254b and/or 256a-256b may represent a field of view of the raw images captured by the cameras 102c, 102d and 102f. The field of view 252a-252b may partially overlap the field of view 254a-254b. The field of view 252a-252b may partially overlap the field of view 256a-256b. The overlapping of the field of views may result in some objects being captured by multiple cameras. If the raw images were stitched (e.g., joined edge-to-edge to create the panoramic video frame) irregularities and/or artifacts may be present in the panoramic video frame. For example, some objects may appear twice (e.g., double objects) and/or objects may change size based on the distances D2 and D3. The irregularities may result in inaccurate information being generated in output video frames (e.g., one car appears twice), which may be distracting for the driver 202. In another example of native functionality of the processors 106a-106n, the processors 106a-106n may perform blending and/or crop the raw images when performing the video stitching to prevent artifacts in the output panoramic video frames that may be provided to the electronic mirror 118b. The processors 106a-106n may be configured to utilize the installed hardware (e.g., the capture devices 102a-102n, the sensors 114 and/or the actuators 116) for multiple purposes in parallel. For example, the overlap of fields of view captured to enable video stitching may be utilized by the virtual stereo pair of cameras 102d/102f and/or the disparity engine 164.

Figure 4:
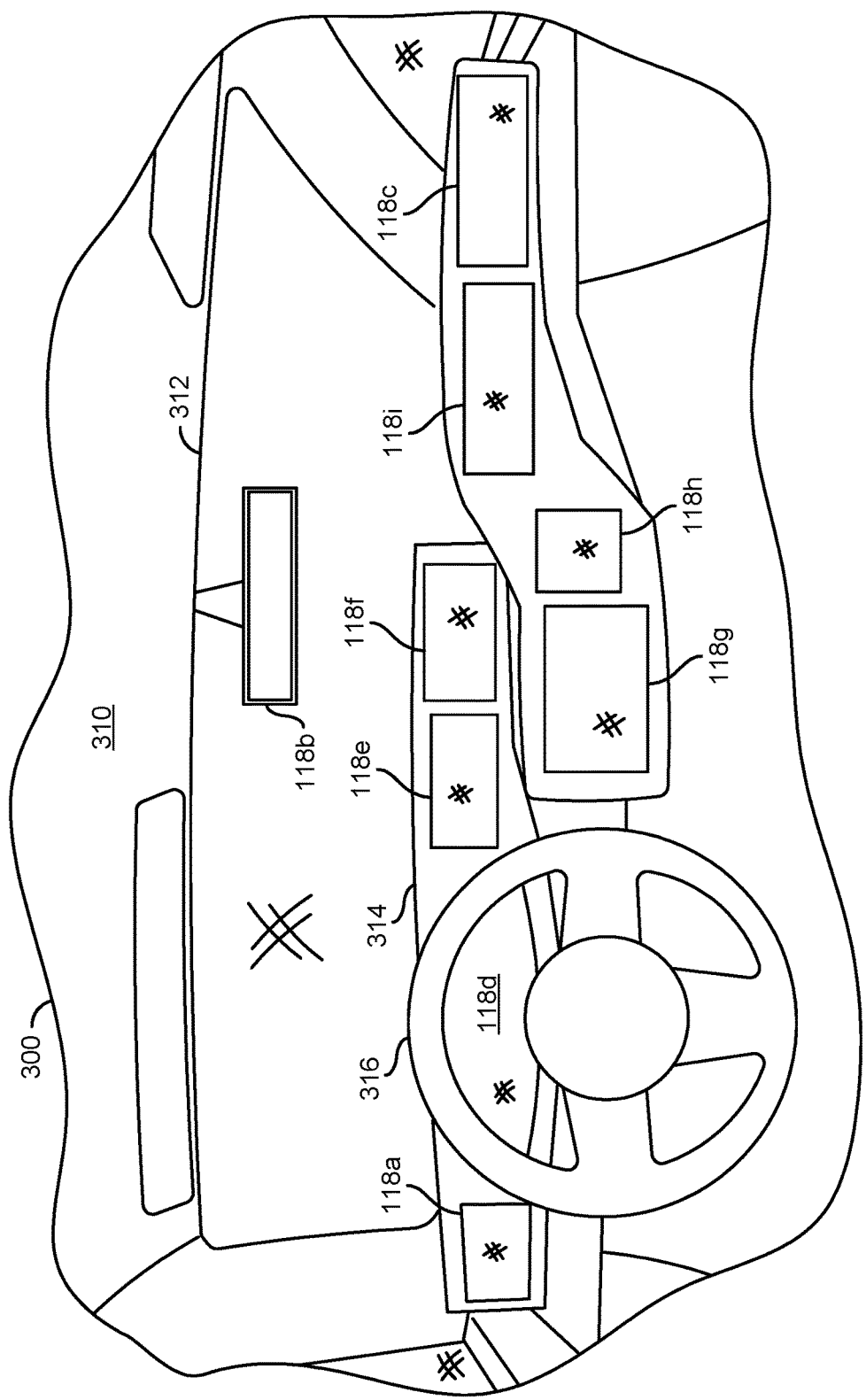
FIG. 4 is a diagram illustrating an interior of a vehicle from the perspective of a driver.

Referring to FIG. 4, a diagram illustrating an interior of the ego vehicle 50 from the perspective of the driver 202 is shown. A perspective 300 is shown. The perspective 300 may be a representation of a view of an interior 310 of the ego vehicle 50. The perspective 300 may generally provide a view of the interior 310 from the location and direction of the driver 202 but may not be what the driver 202 would actually see (e.g., may not be representative of the gaze direction of the driver 202).

The interior 310 of the ego vehicle 50 may comprise a windshield 312, a dashboard 314 and/or a steering wheel 316. A number of the displays 118a-118n are shown. In the example shown, the nine displays 118a-118i are shown. However, the number of the displays 118a-118n available in the ego vehicle 50 may be varied according to the design criteria of a particular implementation. In some embodiments, one or more of the capture devices 102a-102n and/or the lenses 112a-112n may be configured as a driver state monitor (DSM). Generally, the DSM may be configured to capture a view of the driver 202 and the processors 106a-106n may be configured to determine the gaze direction of the driver 202. Determining the gaze direction of the driver 202 may be one example of native functionality of the apparatus 100. Determining the distance and/or relative velocity of the object 260 may be additional functionality (e.g., a secondary function) that may be added by the processors 106a-106n.

In the example shown, the display 118a may be located on the dashboard 314 to the left of the steering wheel 316. For example, the display 118a may be configured to display video data corresponding to the rear view from the driver side (e.g., emulating a driver side reflective mirror). Capturing the rear view from the driver side may be the native functionality of the capture device 102f. In the example shown, the display 118b may be located at the top of the windshield 312. For example, the display 118b may be configured to display video data corresponding to the rear view (e.g., emulating a traditional reflective rearview mirror). Capturing the rear center view may be the native functionality of the capture device 102c. In the example shown, the display 118c may be located on the dashboard 314 to the far right of the interior 310. For example, the display 118c may be configured to display video data corresponding to the rear view from the passenger side (e.g., emulating a passenger side reflective mirror). Capturing the rear view from the passenger side may be the native functionality of the capture device 102.

Similarly, the display 118*d* may be located on the dashboard 314 behind the steering wheel 316, and the displays 118*e*-118*i* may be located on the dashboard 314 at various locations to the right of the steering wheel 316. In one example, one or more of the displays 118*d*-118*i* may be configured to display vehicle information (e.g., warning icons, speed, distance, temperature, odometer, etc.). In another example, one or more of the displays 118*d*-118*i* may be configured as an infotainment touchscreen display (e.g., providing a user interface for audio, navigation, hands-free phone communication, etc.). The processors 106*a*-106*n* may be configured to communicate any of the signals VOUT_A-VOUT_N to any of the displays 118*a*-118*i*. Generating the output VOUT_A-VOUT_N may be the native functionality of the processors 106*a*-106*n*. The processors 106*a*-106*n* may additionally be configured to use the same hardware (e.g., the capture device 102*c*, the capture device 102*d*, the capture device 102*f*, etc.) to provide the additional functionality of determining distance and relative speed of the object 260 without adding additional hardware.

Figure 5:
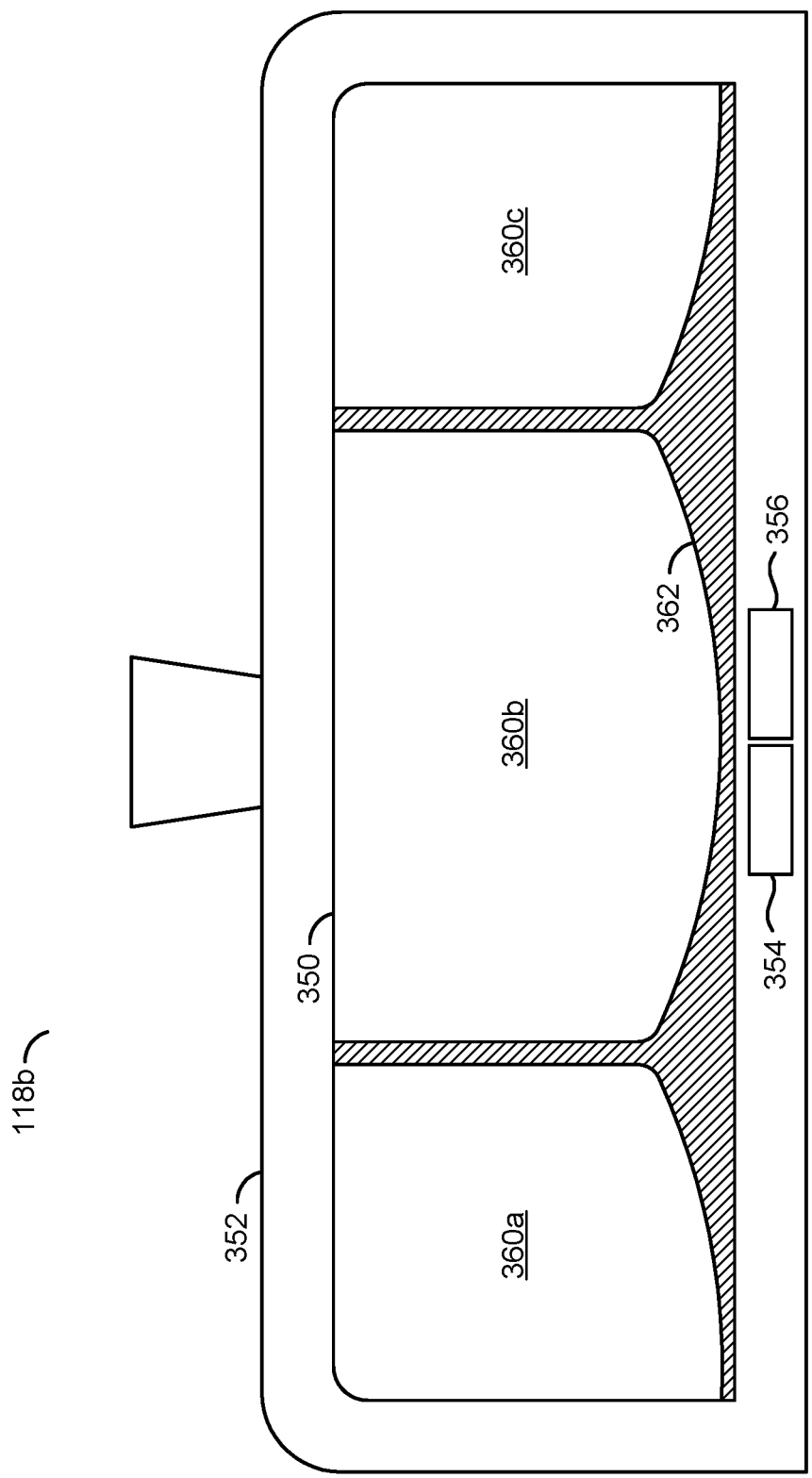
FIG. 5 is a diagram illustrating an example embodiment of an eMirror display.

Referring to FIG. 5, a diagram illustrating an example embodiment of the eMirror display 118*b* is shown. The eMirror display 118*b* may output (e.g., display) a panoramic video frame 350. The panoramic video frame 350 may be generated by the processors 106*a*-106*n* in response to the video frames (e.g., FRAMES_A-FRAMES_N) generated by the capture devices 102*a*-102*n*. For example, one of the signals VOUT_A-VOUT_N may provide the panoramic video frame 350. Generating the panoramic video frame 350 may be an example of the native functionality of the processors 106*a*-106*n*.

The eMirror display 118*b* may comprise a bezel 352. The panoramic video frame 350 may be displayed within the framing created by the bezel 352. A button 354 and a button 356 are shown on the bezel 352. The button 354 and/or the button 356 may be configured to control various features of the eMirror display 118*b* (e.g., contrast adjustment, brightness adjustment, view selection, zoom control, data overlay for the panoramic video frame 350 such as numerical distances, etc.). In some embodiments, the eMirror display 118*b* may implement a touchscreen interface for controlling the various features (e.g., instead of and/or to supplement the button 354 and the button 356).

In the example shown, the panoramic video frame 350 may comprise three portions 360*a*-360*c* and an invalid area 362. The three portions 360*a*-360*c* may comprise video frames captured by the capture devices 102*a*-102*n* that have been stitched together by the processors 106*a*-106*n* to form the output panoramic video frame 350. In the example shown in association with FIG. 3, the portion 360*a* may correspond with the video frames FRAMES_F generated by the driver side capture device 102*f*, the portion 360*b* may correspond with the video frames FRAMES_C generated by the rear capture device 102*c* and the portion 360*c* may correspond with the video frames FRAMES_D generated by the passenger side capture device 102*d*. The size and/or shape of the portions 360*a*-360*c* and/or the invalid area 362 may be varied according to the design criteria of a particular implementation.

The processors 106*a*-106*n* may be configured to perform video operations (e.g., warping and/or scaling) of the video frames captured by the capture devices (e.g., 102*c*, 102*d* and 102*f*) corresponding to the lenses 112*c*, 112*d* and 112*f* of the ego vehicle 50. The video operations may further comprise video stitching to stitch the video frames (e.g., FRAMES_F, FRAMES_C and FRAMES_D) to generate the panoramic video frames 350 (e.g., join video frames and remove artifacts such as double objects). The processors 106*a*-106*n* may place the captured video frames into the assigned areas and stitch the video frames together to provide the final display for the panoramic video frames 350. The video operations performed by the processors 106*a*-106*n* may be configured to generate the panoramic video frames 350 to fit the size and/or shape of the eMirror display 118*b*. The eMirror display 118*b* may receive the signal VOUT_B and output the panoramic video frames 350.

The invalid area 362 may be a portion of the panoramic video frame 350 that does not display video data (e.g., a gap in the video data). For example, the invalid area 362 may comprise blank information (e.g., null video data) and/or masking. The invalid area 362 may comprise portions of the video frames (e.g., FRAMES_F, FRAMES_C and FRAMES_D) that overlap and/or result in other visual artifacts when the stitching operations are performed by the video processors 106*a*-106*n*. For example, the invalid area 362 may be intelligently selected by the processors 106*a*-106*n* to prevent visual distractions from appearing in the panoramic video frames 350. The visual distractions may cause the driver 202 difficulty and/or confusion when viewing the panoramic video frames 350.

The functionality of the processors 106*a*-106*n* shown in association with FIG. 4 and FIG. 5 may be examples of native functionality of the apparatus 100. The apparatus 100 may utilize hardware installed in the ego vehicle 50 (e.g., the capture devices 102*a*-102*n*, the interface 104, the communication devices 110, the sensors 114, the actuators 116, the displays 118*a*-118*n*, etc.) to perform the native functionality (e.g., stitching video frames, performing object detection, generating video frames to fit the size of various displays, etc.). The apparatus 100 may be further configured to utilize the hardware (e.g., the capture devices 102*a*-102*n*, the interface 104, the communication devices 110, the sensors 114, the actuators 116, the displays 118*a*-118*n*, etc.) for multiple purposes. Utilizing the available hardware for multiple purposes may enable additional functionality to be available without the added cost and/or complexity of additional hardware. The additional functionality may further provide redundancy for various sensors (e.g., determining the distance to the object 260 may provide a level of redundancy for detections made by a rear proximity sensor) system such as radar or lidar. Redundancy may be important for vehicle safety standards to ensure that some features (e.g., proximity detection) is still available even if one sensor system fails.

Figure 6:
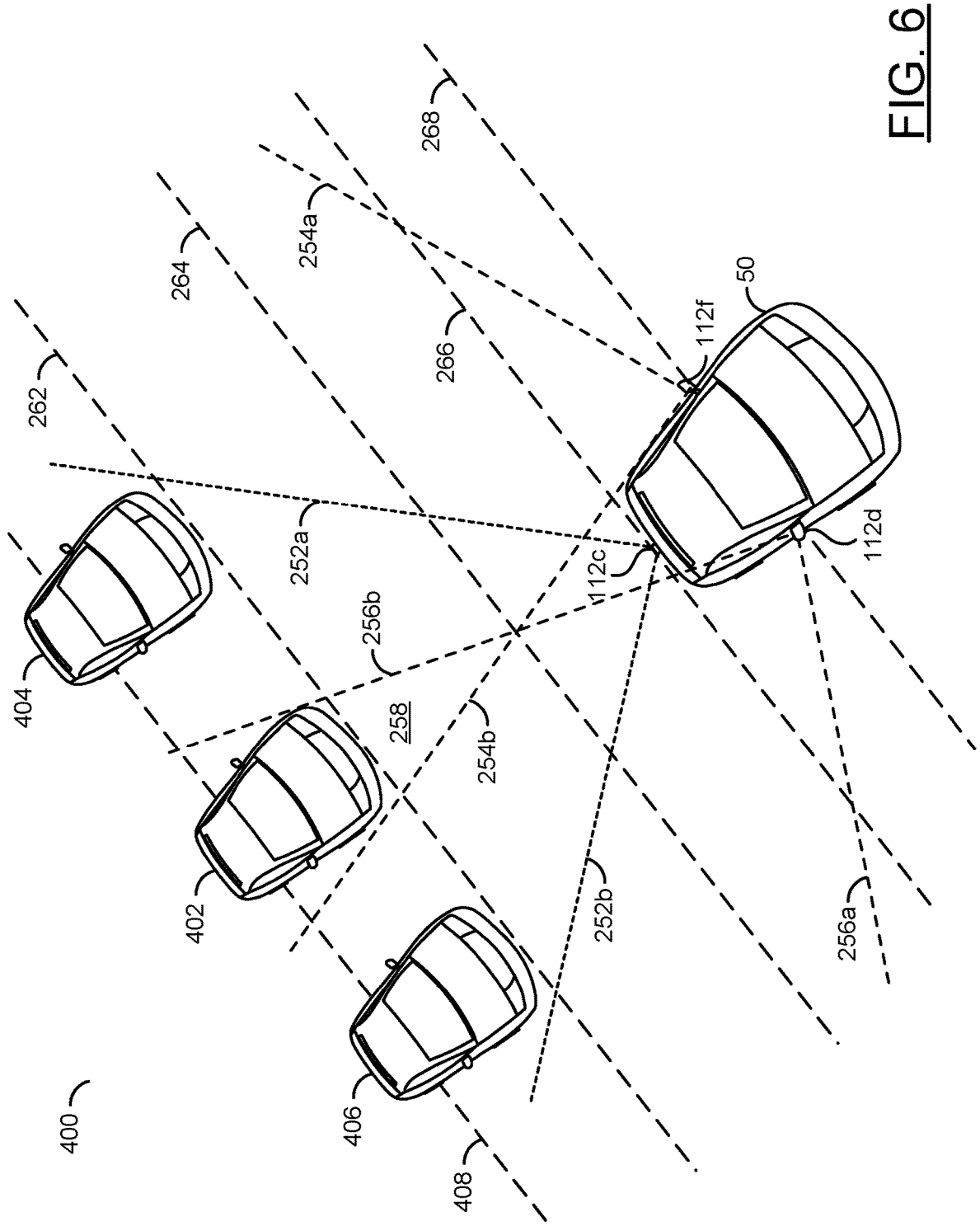
FIG. 6 is a diagram illustrating an example driving scenario.

Referring to FIG. 6, a diagram illustrating an example driving scenario 400 is shown. The ego vehicle 50 is shown in the driving scenario 400. The side view camera lenses 112*d* and 112*f* are shown on the ego vehicle 50 at the reference location 268. The rear camera lens 112*c* is shown at the reference location 266. For example, the lens 112*c* may be at a nominal location corresponding to the rear center location of the ego vehicle 50 and the lenses 112*d* and 112*f* may be at nominal locations corresponding to locations of traditional side mirrors.

The field of view 254*a*-254*b* of the driver side lens 112*f* is shown. The field of view 256*a*-256*b* of the passenger side lens 112*d* is shown. The field of view 252*a*-252*b* of the rear lens 112*c* is shown. The overlapping region 258 is shown comprising a portion of the field of view 254*a*-254*b* and a portion of the field of view 256*a*-256*b*.

A vehicle 402, a vehicle 404 and a vehicle 406 are shown in the example scenario 400. The vehicle 402, the vehicle 404 and the vehicle 406 are shown behind the ego vehicle 50, generally at the reference location 262. A line 408 is shown. The line 408 may be a reference location.

In the example scenario 400, a front end of the vehicles 402-406 may be at the reference location 262 and a rear end of the vehicles 402-406 may be at the reference location 408. The vehicle 402 may be directly behind the ego vehicle 50 at the reference location 262. The vehicle 402 may be entirely within the overlapping region 258. In an example, the vehicle 402 may be the object 260 shown in association with FIG. 3. The vehicle 404 may be behind the ego vehicle 50 at the reference location 262 and one lane over (e.g., one lane to the left side of the ego vehicle 50 from the perspective of the driver 202). The vehicle 404 may be outside of the overlapping region 258. The vehicle 406 may be behind the ego vehicle 50 at the reference location 262 and one lane over (e.g., one lane to the right side of the ego vehicle 50 from the perspective of the driver 202). The vehicle 406 may be outside of the overlapping region 258. In an example, the reference location 264 may be approximately fifteen meters behind the ego vehicle 50 and the reference location 262 may be greater than fifteen meters behind the ego vehicle 50 (e.g., from the reference location 266).

In the example scenario 400, each of the vehicles 402-406 may be within the field of view 252a-252b of the rear lens 112c. In the example scenario 400, the vehicle 402 and the vehicle 404 may be within the field of view 254a-254b of the driver side lens 112f and the vehicle 406 may not be within the field of view 254a-254b. In the example scenario 400, the vehicle 402 and the vehicle 406 may be within the field of view 256a-256b of the passenger side lens 112d and the vehicle 404 may not be within the field of view 256a-256b.

Figure 7:
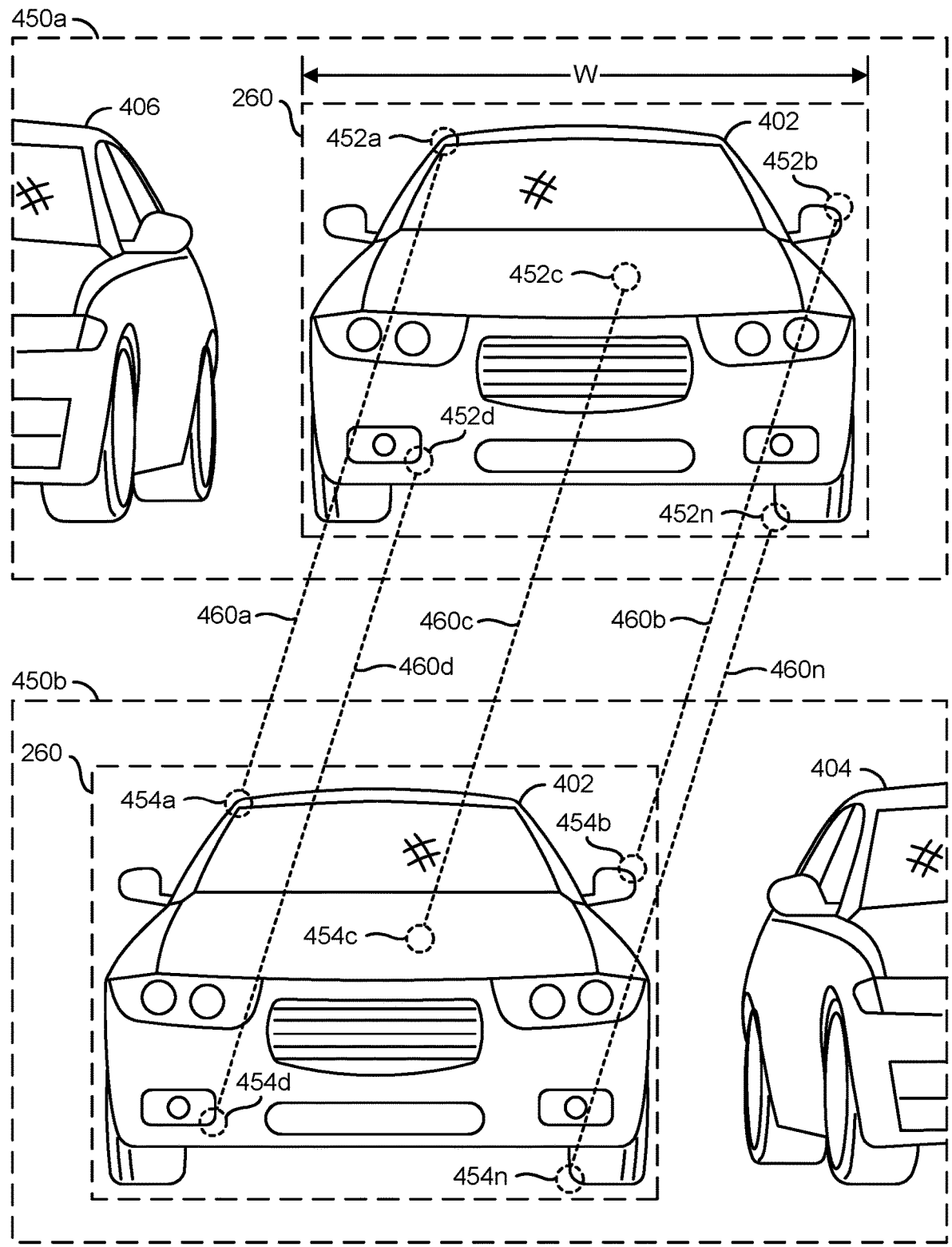
FIG. 7 is a diagram illustrating an example stereo pair of video frames captured by the virtual stereo pair of cameras.

Referring to FIG. 7, a diagram illustrating an example stereo pair of video frames 450a-450b captured by the virtual stereo pair of cameras 102d/102f is shown. In the example shown, the video frame 450a may be captured by the passenger side capture device 102d and the video frame 450b may be captured by the driver side capture device 102f. The video frame 450a may be one of the video frames FRAMES_D captured via the lens 112d and the video frame 450b may be one of the video frames FRAMES_F captured via the lens 112f. The video frames FRAMES_D and the video frames FRAMES_F may be presented to the processors 106a-106n.

The example stereo pair of video frames 450a-450b may show a portion of the video data captured by the capture device 102d and/or the capture device 102f (e.g., the field of view 254a-254b captured by the capture device 102f may comprise more video data than shown in the video frame 450a and/or the field of view 256a-256b captured by the capture device 102d may comprise more video data than shown in the video frame 450b). The stereo pair of video frames 450a-450b may be representative examples of video frames captured by a virtual stereo pair of cameras implemented by the apparatus 100.

The stereo pair of video frames 450a-450b are shown as rectilinear video frames. The video processing pipeline 156 may comprise a dewarping engine configured to perform dewarping video operations to generate rectilinear video frames from one or more non-rectilinear video frames captured by the capture devices 102a-102n. In an example, the processors 106a-106n may receive non-rectilinear video frames (e.g., captured by cameras with a 160 degree field of view lens) having a barrel/fisheye lens characteristic. In some embodiments, the processors 106a-106n may be configured to perform the video operations and/or the comparison operations (e.g., detect objects, determine distance, determine relative velocity, etc.) on the non-rectilinear video frames presented to the processor 106a-106n. In some embodiments, the processors 106a-106n may be configured to dewarp the non-rectilinear video frames using the dewarping engine and then perform the video operations on the rectilinear video frames.

The processors 106a-106n may use both rectilinear video frames and/or non-rectilinear video frames for various functionality. In one example, the apparatus 100 may leverage the distortion for generating the panoramic video frame 350 with desirable attributes (e.g., size continuity at stitching points, reduced invalid area 362, reduced scaling, etc.) for the native functionality of presenting video to the rearview electronic mirror display 118b. In another example, the processors 106a-106n may generate the rectilinear video frames for the various displays 118a-118n (e.g., rectilinear video frames have a similar appearance to regular human vision).

The stereo pair of video frames 450a-450b may comprise video data captured from a similar, but slightly different, perspective. Generally, the stereo pair of video frames 450a-450b may capture the same area and/or objects. Capturing a similar view of an area and/or objects in the stereo pair of video frames 450a-450b may enable the disparity engine 164 to perform calculations (e.g., comparison operations) to determine a relative distance and/or velocity of detected objects.

In the example shown, the stereo pair of video frames 450a-450b may capture a view of an area behind the ego vehicle 50. For example, the virtual stereo pair of cameras 102d/102f may be directed towards the rear of the ego vehicle 50. In an example, the stereo pair of cameras 102d/102f may capture the overlapping region 258 at approximately fifteen meters behind the ego vehicle 50. The processors 106a-106n may be configured to select any of the capture devices 102a-102n that have a symmetrical orientation as the virtual stereo pair. The capture devices 102a-102n selected as the virtual stereo pair and/or the location of the area captured by the virtual stereo pair of cameras may be varied according to the design criteria of a particular implementation.

The video frame 450a may comprise the vehicle 402 and a portion of the vehicle 406. The vehicle 402 is shown detected as the object 260. A number of dotted circles 452a-452n are shown. The dotted circles 452a-452n may represent feature points of the object 260 detected by the processors 106a-106n. In an example, the feature point 452a may correspond to a top left corner of the vehicle 402, the feature point 452b may correspond to a driver side mirror of the vehicle 402, the feature point 452c may correspond to the hood of the vehicle 50, the feature point 452d may correspond to a bottom left of the vehicle 402 and the feature point 452n may correspond to the right front tire of the vehicle 402. The location, type and/or amount of feature points 452a-452n detected by the processors 106a-106n may be varied according to the design criteria of a particular implementation.

The video frame 450b may comprise the vehicle 402 and a portion of the vehicle 404. The vehicle 402 is shown detected as the object 260. A number of dotted circles 454a-454n are shown. The dotted circles 454a-454n may represent feature points of the object 260 detected by the processors 106a-106n. In an example, the feature point 454a may correspond to a top left corner of the vehicle 402, the feature point 454b may correspond to a driver side mirror of the vehicle 402, the feature point 454c may correspond to the hood of the vehicle 50, the feature point 454d may correspond to a bottom left of the vehicle 402 and the feature point 454n may correspond to the right front tire of the vehicle 402. Generally, the feature points 454a-454n in the video frame 450b may correspond to the respective feature points 452a-452n detected in the video frame 450a.

The vehicle 402 is shown located in a slightly different position in each of the stereo pair of video frames 450a-450b. The vehicle 404 is partially shown in the video frame 450b but not shown in the video frame 450a. The vehicle 406 is partially shown in the video frame 450a but not shown in the video frame 450b. The different location of the vehicles 402-406 in the stereo pair of video frames 450a-450b may represent that the stereo pair of video frames 450a-450b have been captured from a slightly different perspective. For example, the video frame 450a may be captured a distance S2 from the center line 270 of the ego vehicle 50 and the video frame 450b may be captured a distance S1 from the center line of the ego vehicle 50 (e.g., the virtual stereo pair of cameras 102d/102f may be a distance S1+S2 apart and with the symmetrical orientation S1=S2). The stereo pair of video frames 450a-450b may capture a different angle. For example, the capture device 102d and the capture device 102f may be angled inwards (e.g., instead of being aimed straight back). Because the capture device 102d and the capture device 102f may be angled inwards, the field of view 254a-254b and the field of view 256a-256b may capture the overlapping area 258.

The CNN module 150 may be configured to detect the object 260 in the stereo pair of video frames 450a-450b. The CNN module 150 may be configured to recognize the vehicle 402 as the same object in both of the stereo pair of video frames 450a-450b. The CNN module 150 may detect the feature points 452a-452n in the video frame 450a and cross-reference the feature points 454a-454n detected in the video frame 450b. The CNN module 150 may compare the feature points 452a-452n and the feature points 454a-454n to determine that the vehicle 402 detected as the object 260 in the video frame 450a is the same as the vehicle 402 detected as the object 260 in the video frame 450b. The CNN module 150 may generate a confidence level to indicate a likelihood that the object 260 is the same object in both of the stereo pair of video frames 450a-450b. If the confidence level is above a pre-determined threshold value, then the decision module 158 may determine that the object 260 is in both of the stereo video frames 450a-450b and enable the disparity engine 164 to perform a comparison.

If the CNN module 150 determines that the object 260 is the same object in both of the stereo pair of video frames 450a-450b, the disparity engine 164 may determine the relative distance and/or relative velocity of the object 260 with respect to the virtual stereo pair of cameras 102d/102f. The disparity engine 164 may be configured to determine the relative distance and/or velocity of the object 260 based on the different perspectives and symmetrical orientation of the virtual stereo pair of cameras 102d/102f. The disparity engine 164 may be configured to perform comparison operations by calculating the differences (e.g., disparity) between the object 260 in the video frame 450a and the object 260 captured in the video frame 450b. The disparity engine 164 may determine the difference by comparing various feature points of the object 260 detected by the CNN module 150.

Dotted lines 460a-460n are shown. The dotted lines 460a-460n may be, respectively, connected between the feature points 452a-452n of the video frame 450a and the corresponding feature points 454a-454n of the video frame 450b. In the example shown, the dotted line 460a may connect the feature point 452a to the feature point 454a, the dotted line 460b may connect the feature point 452b to the feature point 454b, the dotted line 460c may connect the feature point 452c to the feature point 454c, the dotted line 460d may connect the feature point 452d to the feature point 454d and the dotted line 460n may connect the feature point 452n to the feature point 454n. The dotted lines 460a-460n may connect to the same feature of the object 260 in both of the stereo pair of video frames 450a-450n.

The dotted lines 460a-460n may represent a comparison operation performed by the disparity engine 164. The disparity engine 164 may perform the comparison operation by determining an offset distance between the feature points 452a-452n of the video frame 450a and the corresponding feature points 454a-454n of the video frame 450b. The dotted lines 460a-460n may be a visual representation of the comparison performed by the disparity engine 164. The disparity engine 164 may measure the distance between the location of the feature points 452a-452n and the feature points 454a-454n.

The disparity engine 164 may be configured to perform geometric and/or trigonometric calculations based on the measured distances between the feature points 452a-452n and the feature points 454a-454n and the characteristics of the virtual stereo pair of cameras 102d/102f. In an example, the characteristics of the virtual stereo pair of cameras 102d/102f may comprise the distance (e.g., S1+S2) between the virtual stereo pair of cameras 102d/102f and the inward angle of the stereo pair of cameras 102d/102f. The calculations performed by the disparity engine 164 may determine the relative distance of the object 260 from the stereo pair of cameras 102d/102f. Based on the distance of the object 260 from the stereo pair of cameras 102d/102f (e.g., the distance D3 shown in association with FIG. 3) and the length of the vehicle (e.g., the distance D2 shown in association with FIG. 3), the processors 106a-106n may determine the distance of the object 260 from the rear end of the ego vehicle 50. The calculations performed by the disparity engine 164 may determine the relative velocity of the object 260 with respect to the ego vehicle 50 by comparing the stereo pair of images 450a-450b captured over time (e.g., by analyzing a sequence of stereo pairs of images and comparing the change in relative distance between the object 260 and the virtual stereo pair of cameras 102d/102f over the time the images were captured).

When the object 260 is in the overlapping region 258, the disparity engine 164 may determine the distance of the object 260. By knowing the distance, the disparity engine 164 may determine (e.g., measure) the physical width of the object 260. A width W is shown above the object 260 in the video frame 450a. The width W may represent the physical width of the vehicle 402. In an example, the disparity engine 164 may convert the number of pixels of the object 260 to a width measurement (e.g., feet, inches, meters, etc.) based on the distance determined using the comparison operations and/or the pre-determined distance of the overlapping region 258 from the ego vehicle 50. In an example, the conversion of the number of pixels to the width measurement may be determined using the geometric and/or trigonometric calculations based on the measured distances between the feature points 452a-452n and the feature points 454a-454n and the characteristics of the virtual stereo pair of cameras 102d/102f.

The width W of the object 260 may be stored in the memory 108. The processors 106a-106n may use the width W determined when the object 260 is within the overlapping region 258 to help determine a distance of the object 260 when the object 260 is no longer in the overlapping region 258. For example, to track the widths of vehicles detected, the processors 106a-106n may determine the physical width of the detected vehicle when the vehicle is within the overlapping region 258, store the physical width with a unique identifier to associate the width and/or feature markers with the vehicle, and then retrieve the physical width when the same feature markers are detected for the same vehicle when located outside of the overlapping region 258.

The processors 106a-106n may be configured to determine a proportion of the width W measured as a number of pixels to the physical measurement (e.g., measured in meters) of the width W determined by the disparity engine 164. The processors 106a-106n may be configured to determine a relationship between the distance of the detected object 260 from the ego vehicle 50 and the width W of the object 260. For example, the proportion of the width W to the distance of the object 260 may be used to determine a distance of the object 260 when the object 260 is closer to the ego vehicle 50.

Figure 8:
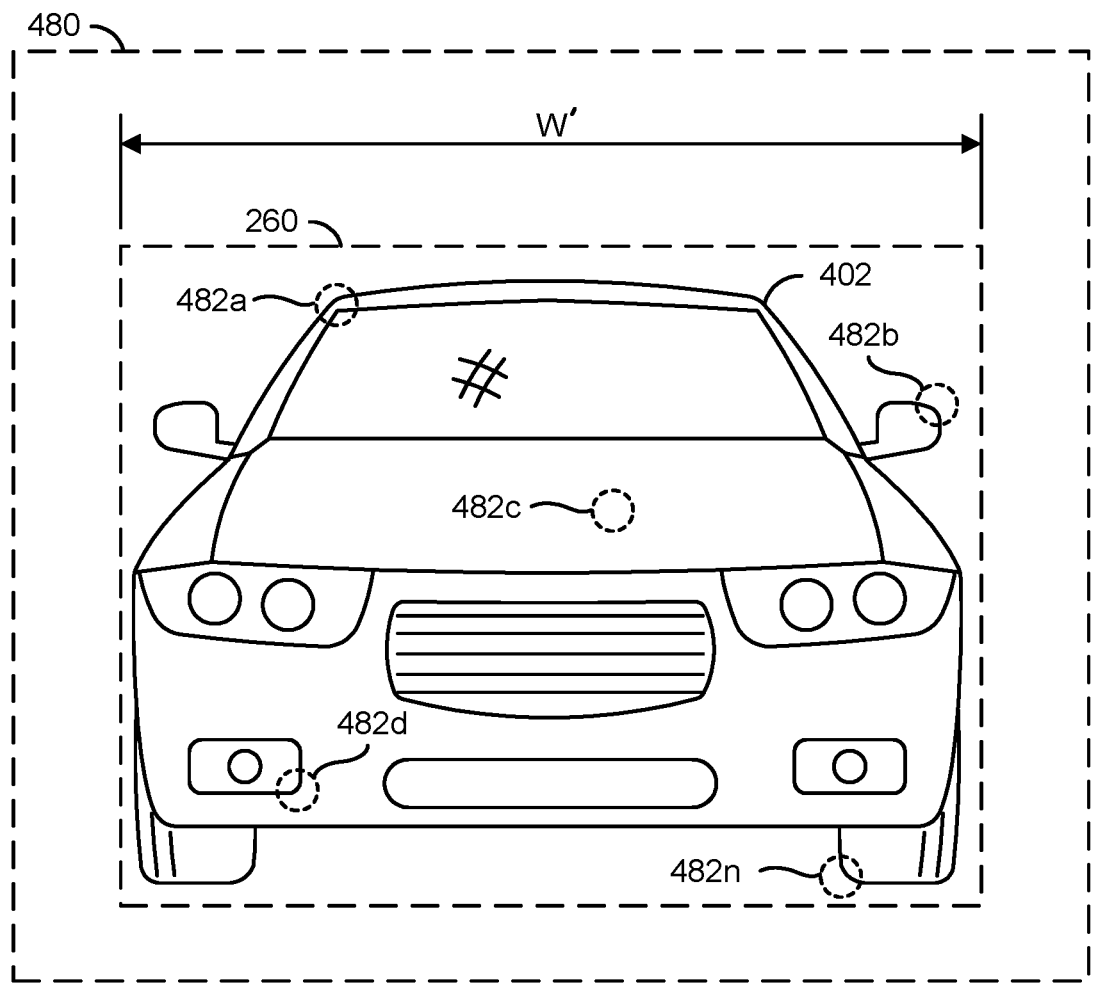
FIG. 8 is a diagram illustrating an example monocular video frame captured by a rear camera.

Referring to FIG. 8, a diagram illustrating an example monocular video frame captured by the rear camera 102c is shown. An example video frame 480 is shown. The video frame 480 may be one of the video frames FRAMES_C captured by the capture device 102c via the lens 112c and presented to the processors 106a-106n.

In the example shown, the video frame 480 may be a rectilinear video frame. The example rectilinear video frame 480 may comprise a front view of the vehicle 402. The content of the rectilinear video frame 480 may generally correspond with the field of view 252a-252b shown in association with FIG. 3. In the example shown, the video frame 480 may be captured at a time after the scenario 400 shown in association with FIG. 6 (e.g., the vehicle 402 may be located closer to the ego vehicle 50). The vehicle 402 may be outside of the overlapping region 258 (e.g., closer to the ego vehicle 50 than the pre-determined distance of the overlapping region 258). For example, the vehicle 402 may be located within fifteen meters of the ego vehicle 50.

The video frame 480 may be a monocular video frame. The monocular video frame 480 may be captured by one of the capture devices 102a-102n. For example, for the monocular video frame 480 shown, the rear capture device 102c may capture the monocular video frame 480 and the other capture devices 102a-102n may not capture a similar view as the rear capture device 102c (e.g., there may not be another one of the capture devices 102a-102n that has a symmetrical orientation with respect to the rear capture device 102c).

The rectilinear video frame 480 may be generated by the processors 106a-106n for various purposes. The processors 106a-106n may generate the video frame 480 for the video stitching operations in order to generate the panoramic video frame 350. For example, the video frame 480 may be used as the center video portion 360b. In some embodiments, the video frame 480 may be presented to one of the displays 118a-118n as the video signal VOUT C to provide a backup/reverse camera. In some embodiments, the monocular video frame 480 may be a non-rectilinear video frame (e.g., to capture a wider field of view 252a-252b). For example, the processors 106a-106n may be configured to use the dewarping engine to convert the non-rectilinear video frame to a rectilinear video frame to perform object detection. The methods used by the apparatus 100 to capture the video frame 480 and/or convert the video frame 480 to enable object detection may be varied according to the design criteria of a particular implementation.

The monocular video frame 480 may comprise the vehicle 402. The CNN module 150 may be configured to detect the vehicle 402. In the example shown, the vehicle 402 may be detected as the object 260. The CNN module 150 may be configured to extract feature points corresponding to the object 260.

Dotted circles 482a-482n are shown on the object 260. The dotted circles 482a-482n may represent the features points of the object 260 extracted by the CNN module 150. In the example shown, the feature point 482a may correspond to a top left corner of the vehicle 402, the feature point 482b may correspond to a driver side mirror of the vehicle 402, the feature point 482c may correspond to the hood of the vehicle 50, the feature point 482d may correspond to a bottom left of the vehicle 402 and the feature point 482n may correspond to the right front tire of the vehicle 402. Generally, the feature points 482a-482n in the monocular video frame 480 may correspond to the respective feature points 452a-452n detected in the video frame 450a and the respective feature points 454a-454n detected in the video frame 450b.

The processors 106a-106n may be configured to compare the detected object 260 and/or the extracted feature points 482a-482n with the characteristics of the objects and/or the extracted feature points stored in the memory 108. If the detected object 260 and/or the extracted feature points 482a-482n matches (or substantially matches with high enough confidence level), the characteristics of the object and/or the extracted feature points stored in the memory 108 then the processors 106a-106n may determine that the object 260 captured in the monocular video frame 480 matches the object 260 captured at an earlier time in the stereo pair of video frames 450a-450b. When the processors 106a-106n determine that the object 260 captured in the monocular video frame 480 is the same object as the object 260 captured earlier in the stereo video frames 450a-450b, then the processors 106a-106n may retrieve the characteristics stored in the memory 108 (e.g., the stored physical width W of the object 260).

Generally, determining a distance to an object using a monocular video frame alone may be unreliable and/or have errors in accuracy of the distance measurement. The processors 106a-106n may be configured to use the physical width W previously determined when the object 260 was in the overlapping region 258 to determine the current distance to the object 260. The distance, relative velocity and/or physical width W determined using the stereo pair of cameras 102d/102f may be reliable information. The sensor fusion module 152 may use the reliable information as a separate source of data to determine the distance to the object 260.

A width W' is shown. The width W' may be a physical width of the object 260. The processors 106a-106n may determine the width W' by analyzing the video data in the monocular video frame 480. In an example, the processors 106a-106n may determine a number of pixels wide that the object 260 is in the monocular video frame 480. In another example, the processors 106a-106n may determine a proportion of the monocular video frame 480 that the object 260 occupies compared to the total width of the monocular video frame 480. The method of determining the width W' from the monocular video frame 480 by the processors 106a-106n may be varied according to the design criteria of a particular implementation.

Using the width W' from the monocular view 480, and the exact physical width W determined using the stereo pair of video frames 450a-450b, the processors 106a-106n may determine the distance of the object 260 from the ego vehicle 50 when the object 260 is no longer in (e.g., closer than the pre-determined distance to) the overlapping region 258. In an example, the processors 106a-106n may compare the width of the ego vehicle 50 in pixels in the monocular view 480 (e.g., the width W') to the width of the ego vehicle 50 in pixels in the stereo pair of video frames 450a-450b (e.g., the width W) and use the proportion of the width in pixels in the stereo pair of video frames 450a-450b to the physical measurement (e.g., the width measurement in meters determined by the disparity engine 164) to determine the physical width measurement. For example, the physical width of the object 260 should be the same physical measurement in both the stereo pair of video frames 450a-450b and in the monocular video frame 480 (e.g., the same object has the same width). However, the number of pixels occupied by the width of the object 260 compared to the total width of the video frame may be different. For example, when the object 260 is farther away from the ego vehicle 50 (as in the stereo pair of video frames 450a-450b), then the object 260 may occupy a smaller proportion of the pixels in the video frame compared to the number of pixels occupied by the object 260 when closer to the ego vehicle 50 (as in the monocular video frame 480). Using the relationship between the distance from the ego vehicle 50 and the width of the object 260 determined while the object was in the overlapping region 258, the processors 106a-106n may determine the current distance of the object 260 from the monocular video frame 480 from the current width measurement W'.

By analyzing the distance in the monocular view 480 over time using a sequence of monocular video frames, the processors 106a-106n may further determine the relative velocity of the object 260 with respect to the ego vehicle 50. The processors 106a-106n may use information determined from when the object 260 was within the overlapping region 258 with current information about the object about the object 260 outside of the overlapping region 258 to determine the distance and/or relative velocity of the object 260.

The results of video analysis of the stereo pair of video frames 450a-450b may be used to augment and/or enhance the results of video analysis of the monocular video frame 480. In an example, the video analysis of the stereo pair of video frames 450a-450b may be performed first when the object 260 is farther away from the ego vehicle 50 and the results of the video analysis of the stereo pair of video frames 450a-450b may be used later when the object 260 is closer to the ego vehicle 50 (e.g., within fifteen meters). The augmentation and/or enhancement of the results may not be determined if performing the video analysis on the monocular video frame 480 alone. In another example, augmentation and/or enhancement of the results may provide redundancy and/or training data for using artificial intelligence to detect distance from the monocular video frame 480 (e.g., may be compared to results from the monocular video frame 280 alone and/or from radar).

Distance measurements determined by performing video analysis on the video frame 480 alone may be inaccurate. Implementing the virtual stereo pair of cameras 102d/102f, along with the learning capabilities of the processors 106a-106n may improve the distance measurements. The processors 106a-106n may learn how the measured physical width W and the distance to the ego vehicle 50 that was previously determined using the stereo pair of video frames 450a-450b relates to the monocular width W' measured in the monocular video frame 480 and the distance to the ego vehicle 50 when the object 260 is closer than the overlapping region 258. For example, by performing analysis and/or determining distance and performing physical width measurements W on multiple objects at varying distances, the processors 106a-106n may learn and/or improve the accuracy of determining distance measurements. Using the previously determined physical width W and the results of the learning to determine the monocular physical width W', the processors 106a-106n may determine the distance and/or relative velocity of the object 260 to the ego vehicle 50 with more accuracy and/or less computational resources than using the monocular video frame 580 alone for analysis.

The processors 106a-106n may be configured to use the distance measured from the monocular video frame 480 to provide information to other systems in the vehicle 50. In an example, the distance measured from the monocular video frame 480 may be used to detect a potential rear collision. When an object (e.g., the vehicle 402) is in the overlapping region 258, the object may be at least the pre-determined distance from the ego vehicle 50 (e.g., far enough away to not be considered a potential collision threat). When the object is closer than the pre-determined distance of the overlapping region 258, the object 260 may be a potential collision threat. Using the relative distance from the ego vehicle 50 and/or the relative velocity of the object 260 detected in the monocular video frame 480, the processors 106a-106n may determine whether the object 260 may be a collision threat (e.g., detect a potential rear collision). In response to determining that the object 260 is a potential rear collision threat, the processors 106a-106n may generate the signal CTRL. The signal CTRL may be presented to another vehicle system (e.g., one of the actuators 116). In an example, the signal CTRL may be communicated to a vehicle system that produces an audible warning to warn the driver 202 about the proximity of the object 260. In another example, if the ego vehicle 50 is autonomous, the signal CTRL may be communicated to a vehicle system to cause the ego vehicle 50 to autonomously perform a reaction (e.g., take an evasive action, change direction, speed up, slow down, etc.).

By utilizing the capture device 102d and the capture device 102f as the virtual stereo camera pair 102d/102f may determine the distance and/or relative velocity of objects near the ego vehicle 50. The virtual stereo camera pair 102d/102f, the processors 106a-106n may enable the distance and/or relative velocity of objects near the ego vehicle 50 to be determined without the use of (or in addition to the use of) radar, lidar and/or other of the sensors 114. The virtual stereo camera pair 102d/102f may enable the distance and/or relative velocity of objects near the ego vehicle 50 to be determined in addition the use of radar, lidar and/or other of the sensors 114 (e.g., the virtual stereo camera pair 102d/102f may operate as a redundant source of information for the distance and/or relative velocity of objects near the ego vehicle 50).

Figure 9:
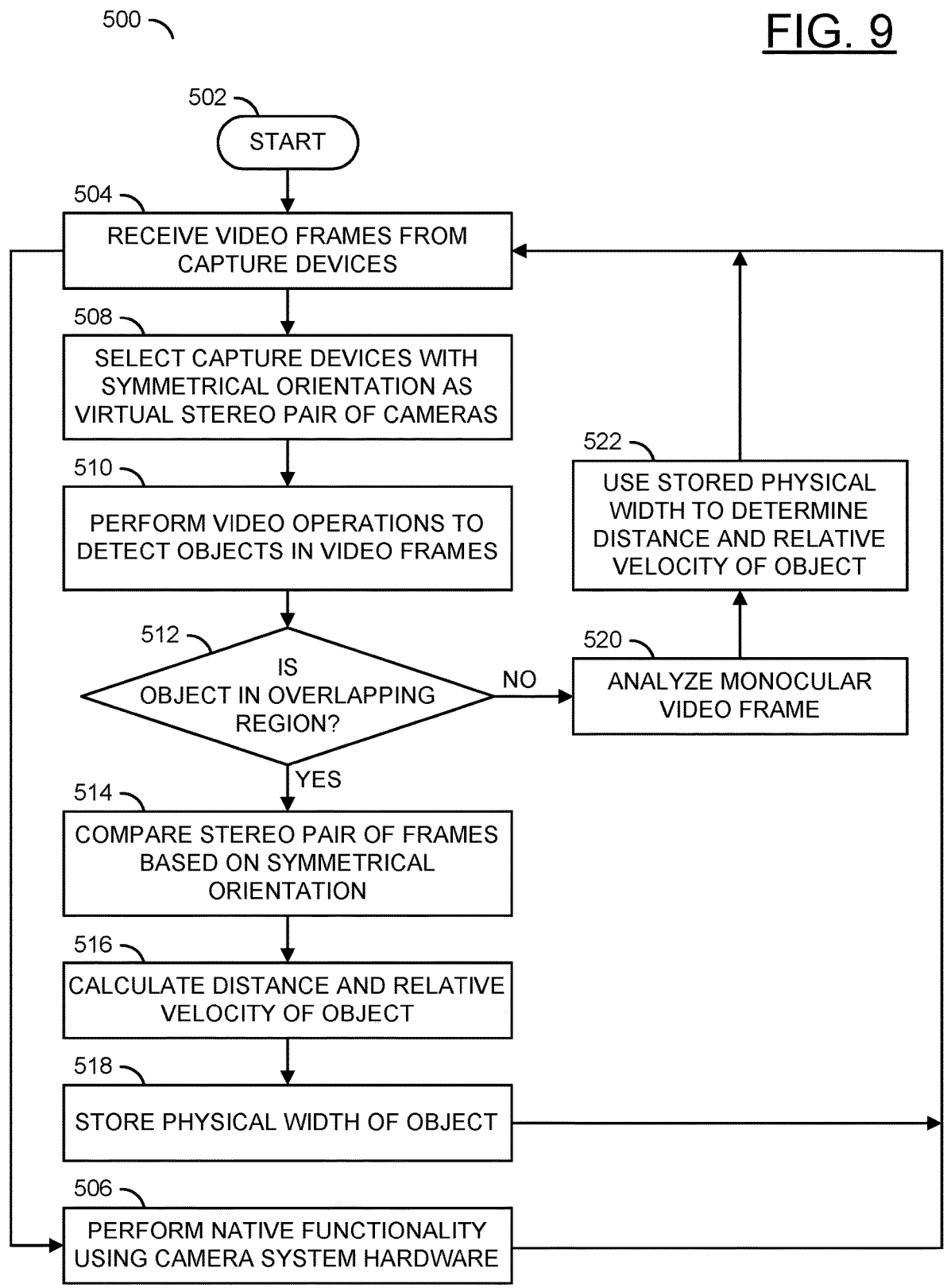
FIG. 9 is a flow diagram illustrating a method for determining object characteristics using a virtual stereo pair of cameras.

Referring to FIG. 9, a method (or process) 500 is shown. The method 500 may determine object characteristics using a virtual stereo pair of cameras. The method 500 generally comprises a step (or state) 502, a step (or state) 504, a step (or state) 506, a step (or state) 508, a step (or state) 510, a decision step (or state) 512, a step (or state) 514, a step (or state) 516, a step (or state) 518, a step (or state) 520, and a step (or state) 522.

The step 502 may start the method 500. In the step 504, the processors 106a-106n may receive the video frames FRAMES_A-FRAMES_N from the capture devices 102a-

102*n*. For example, each of the capture devices 102*a*-102*n* may be configured to generate a sequence of video frames and present the video frames FRAMES_A-FRAMES_N to the processors 106*a*-106*n*. Next, the method 500 may move to the step 506 and/or the step 508. In the step 506, the processors 106*a*-106*n* and/or any other components (e.g., the capture devices 102*a*-102*n*, the interface 104, the memory 108, the communication devices 110, the sensors 114, the actuators 116 and/or the displays 118*a*-118*n*) of the apparatus 100 and/or the ego vehicle 50 may be configured to perform the native functionality using the camera hardware system 100 (e.g., object detection, object classification, collision detection, facial recognition, OCR, generating video output for an electronic mirror, etc.). Next, the method 500 may return to the step 504. Generally, the step 506 may be performed in parallel and/or partially in parallel with the steps 508-522 (e.g., the native functionality may be performed alongside determining characteristics of the objects, calculating distance and/or calculating the relative velocity using a virtual stereo pair of cameras).

In the step 508, the processors 106*a*-106*n* may select two of the capture devices 102*a*-102*n* with the symmetrical orientation to use as a stereo pair of cameras. In an example, the capture device 102*d* and the capture device 102*f* may be symmetrical about the ego vehicle 50, have the equal distance (e.g., D2) to the rear of the ego vehicle 50 and/or may be angled to have the overlapping region 258. Next, in the step 510, the CNN module 150 may be configured to perform the video operations to detect, recognize and/or classify the objects in each of the video frames (e.g., a sequence of a stereo pair of video frames such as the stereo video pair of images 450*a*-450*b*). Next, the method 500 may move to the decision step 512.

In the decision step 512, the processors 106*a*-106*n* may determine whether a detected object (e.g., the detected object 260 such as the vehicle 402) is in the overlapping region 258. For example, if the object 260 is at least the pre-determined distance of the overlapping region 258 away from the ego vehicle 50, the object 260 may be detected in both of the stereo pair of video frames. In an example, the CNN module 150 may detect the vehicle 402 in the video frame 450*a* and also detect the same vehicle 402 in the video frame 450*b* (e.g., the same object captured from the slightly different perspectives of the stereo pair of cameras 102*d*/102*f*). If object 260 is in the overlapping region 258, the method 500 may move to the step 514.

In the step 514, the disparity engine 164 may perform the comparison operations to compare the stereo pair of video frames 450*a*-450*b* based on the symmetrical orientation (e.g., the known distance to the overlapping region 258 from the ego vehicle 50, the known distance S1 and S2 between the stereo pair of cameras 102*d*/102*f*, the known inward angle that each of the stereo pair of cameras 102*d*/102*f* are aimed, etc.). Next, in the step 516, the disparity engine 164 may calculate the distance of the detected object 260 to the ego vehicle 50 and/or the relative velocity of the detected object 260. In the step 518, the disparity engine 164 may measure the physical width W of the detected object 260 and stored the measured width W in the database 174. Next, the method 500 may return to the step 504.

In the decision step 512, if the object 260 is not in the overlapping region 258, then the method 500 may move to the step 520. In the step 520, the processors 106*a*-106*n* may analyze a sequence of video frames captured from a monocular view. In an example, the rear capture device 102*c* may capture the field of view 252*a*-252*b* behind the ego vehicle 50 that does not overlap with fields of view captured by other of the capture devices 102*a*-102*n* in a symmetrical orientation. For example, when the object 260 is closer to the ego vehicle 50 than the pre-determined (e.g., previously known) distance to the overlapping region 258, none of the capture devices 102*a*-102*n* may be suitable to form a stereo pair with the capture device 102*c*. Next, in the step 522, the processors 106*a*-106*n* may use the stored physical width W previously measured from when the object 260 was in the overlapping lapping region 258 (e.g., in the steps 514-518) along with video analysis of the monocular video frame 480 to determine the distance of the object 260 to the ego vehicle 50 and/or the relative velocity of the object 260. Using the physical width W along with the video analysis and machine learning may enable the processors 106*a*-106*n* to determine the distance and/or relative velocity of the object 260 when the object 260 is located closer to the ego vehicle 50 than the pre-determined distance of the overlapping region 258. Next, the method 500 may return to the step 504.

Figure 10:
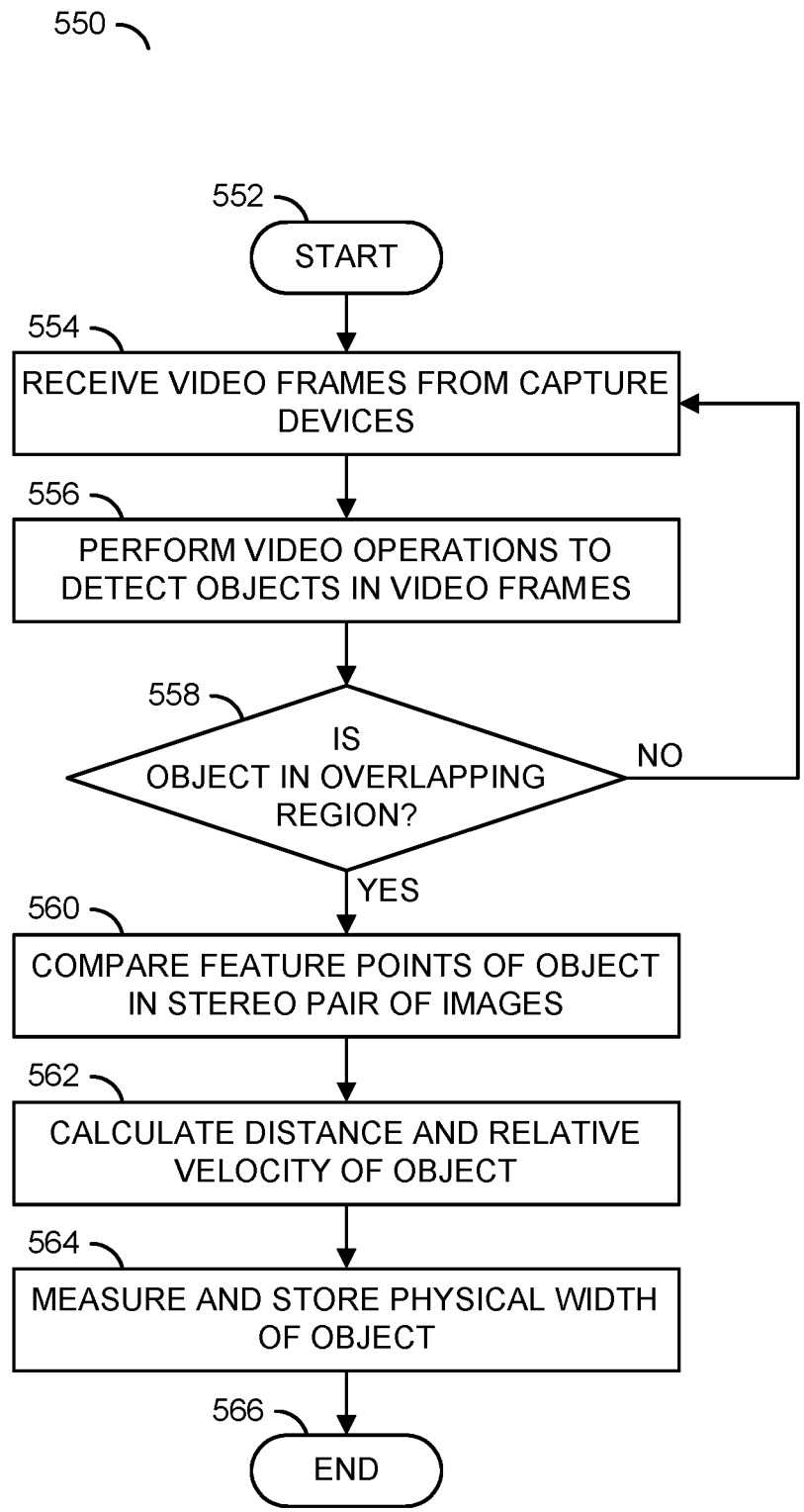
FIG. 10 is a flow diagram illustrating a method for determining characteristics of an object using a virtual stereo pair of cameras in an overlapping region.

Referring to FIG. 10, a method (or process) 550 is shown. The method 550 may determine characteristics of an object using a virtual stereo pair of cameras in an overlapping region. The method 550 generally comprises a step (or state) 552, a step (or state) 554, a step (or state) 556, a decision step (or state) 558, a step (or state) 560, a step (or state) 562, a step (or state) 564, and a step (or state) 566.

The step 552 may start the method 550. In the step 554, the processors 106*a*-106*n* may receive the video frames (e.g., the stereo video frames 450*a*-450*b*) from the capture devices (e.g., the virtual stereo pair of cameras 102*d*/102*f*). Next, in the step 556, the processors 106*a*-106*n* may perform the video operations to detect objects (e.g., the object 260) in the stereo pair of video frames 450*a*-450*b*. Next, the method 550 may move to the decision step 558.

In the decision step 558, the CNN module 150 may determine whether the object 260 is in the overlapping region 258. The object 260 may be in the overlapping region 258 when the same object 260 is detected in both of the stereo pair of video frames 450*a*-450*b*. The CNN module 150 may extract the feature points 452*a*-452*n* of the object 260 in the video frame 450*a* and extract the feature points 454*a*-454*n* of the object 260 in the video frame 450*b* and perform a comparison to determine whether the object 260 is the same object in both of the video frames 450*a*-450*b* (e.g., has the same characteristics such as size, shape color, etc.). If the object 260 is not in the overlapping region 258, the method 550 may return to the step 554. If the object 260 is in the overlapping region 258, then the method 550 may move to the step 560.

In the step 560, the disparity engine 164 may compare the feature points 452*a*-452*n* of the object 260 in one of the stereo pair of video frames 450*a* with the corresponding feature points 454*a*-454*n* of the same object 260 in the other one of the stereo pair of video frames 450*b*. The comparison operations 460*a*-460*n* may determine differences (e.g., an offset) of the two perspective of the object 260 captured by each of the stereo pair of cameras 102*d*/102*f*. Next, the method 550 may move to the step 562.

In the step 562, the disparity engine 164 may calculate the distance of the object 260 from the ego vehicle 50 and/or the relative velocity of the object 260 with respect to the ego vehicle 50. The distance and/or relative velocity may be determined based on trigonometric and/or geometric calculations performed based on the differences determined between the object 260 in the stereo pair of video frames 450*a*-450*b* and/or the characteristics of the symmetrical orientation of the stereo pair of cameras 102*d*/102*f*. In the step 564, the disparity engine 164 may measure the physical width W of the object 260 while the object 260 is in the overlapping region 258. The processors 106a-106n store the physical width W in the database 174 along with the feature points 452a-452n (e.g., to later determine whether a detected object is the same as the object 260). Next, the method 550 may move to the step 566. The step 566 my end the method 550.

Figure 11:
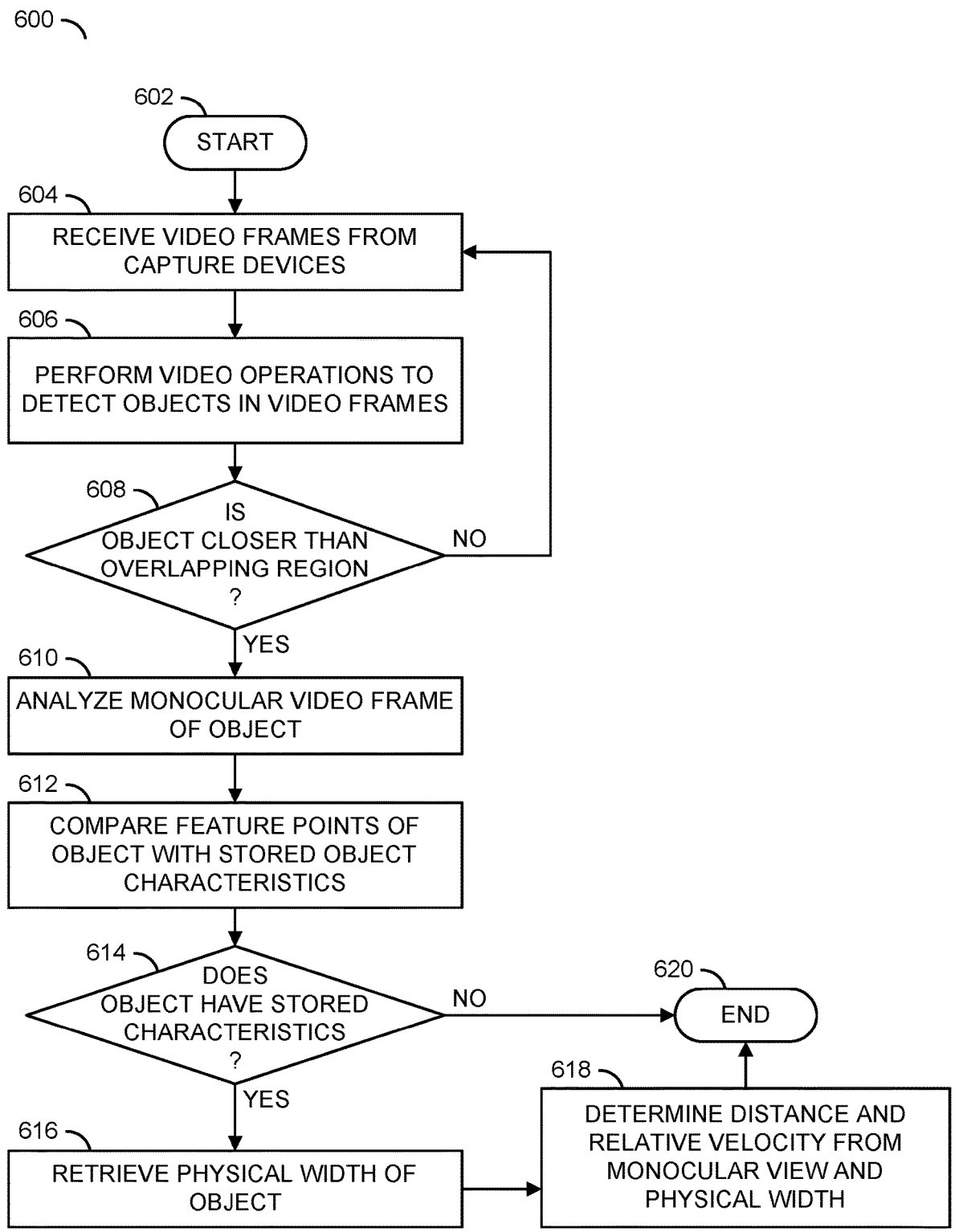
FIG. 11 is a flow diagram illustrating a method for determining characteristics of an object from a monocular view using characteristics determined previously using a virtual stereo pair of cameras.

Referring to FIG. 11, a method (or process) 600 is shown. The method 600 may determine characteristics of an object from a monocular view using characteristics determined previously using a virtual stereo pair of cameras. The method 600 generally comprises a step (or state) 602, a step (or state) 604, a step (or state) 606, a decision step (or state) 608, a step (or state) 610, a step (or state) 612, a decision step (or state) 614, a step (or state) 616, a step (or state) 618, and a step (or state) 620.

The step 602 may start the method 600. Next, in the step 604, the processors 106a-106n may receive the video frames FRAMES_A-FRAMES_N from the capture devices 102a-102n. In the step 606, the processors 106a-106n may perform the video operations to detect objects in the video frames. Next, the method 600 may move to the decision step 608.

In the decision step 608, the processors 106a-106n may determine whether the object 260 is closer to the ego vehicle 50 than the overlapping region 258. For example, when the object 260 is closer than the pre-determined distance of the overlapping region 258, the object 260 may not appear in both of the stereo pair of video frames 450a-450b. In an example, the object 260 may not be in one or both of the field of view 256a-256b of the capture device 102d and the field of view 254a-254b of the capture device 102f. The object 260 may be in the field of view 252a-252b of the capture device 102c (e.g., a monocular view). If the object 260 is not closer than the overlapping region 258, then the method 600 may return to the step 604 (e.g., the processors 106a-106n may perform the video operations on the object 260 in the overlapping region 258 as shown in association with the method 550 in FIG. 10). If the object 260 is closer to the ego vehicle 50 than the overlapping region 258, then the method 600 may move to the step 610.

In the step 610, the processors 106a-106n may analyze the monocular video frame 480. The processors 106a-106n may perform the computer vision operations on the monocular video frame 480 to determine the characteristics of the object 260 (e.g., extract the feature points 482a-482n from the object 260). Next, in the step 612, the CNN module 150 may compare the feature points 482a-482n extracted from the monocular video frame 480 with the characteristics of the objects stored in the database 174. For example, the feature points 452a-452n and/or the feature points 454a-454b of the object 260 may have been extracted and stored previously from the stereo pair of video frames 450a-450b when the object 260 was in the overlapping region 258 at an earlier time. The processors 106a-106n may compare the currently extracted feature points 482a-482n to the previously stored characteristics stored in the memory 108 to determine whether there is a match (e.g., the same object has been detected again, but is now closer to the ego vehicle 50). Next, the method 600 may move to the decision step 614.

In the decision step 614, the processors 106a-106n may determine whether the currently detected object 260 has the same characteristics as any of the characteristics stored (e.g., database entries) in the database 174. For example, the processors 106a-106n may determine whether the currently extracted feature points 482a-482n match the feature points of any of the entries in the database 174 with sufficient confidence to determine that the currently detected object 260 is the same as the stored object. If the object 260 does not have the characteristics of any of the stored characteristics, then the method 600 may move to the step 620. If the object 260 does have the characteristics of at least one of the stored characteristics, then the method 600 may move to the step 616.

In the step 616, the processors 106a-106n may retrieve the physical width W from the database 174. The processors 106a-106n may retrieve the previously measured width W of the object database entry that matches the feature points 482a-482n of the currently detected object 260. Next, in the step 618, the processors 106a-106n may perform the computer vision operations on the monocular video frame 480 to determine the current width W' of the currently detected object 260. The processors 106a-106n may determine the distance of the object 260 from the ego vehicle 50 and/or the relative velocity of the object 260 with respect to the ego vehicle 50 based on the computer vision operations, the machine learning, the previously measured width W and the current width W'. Next, the method 600 may move to the step 620. The step 620 may end the method 600.

Figure 12:
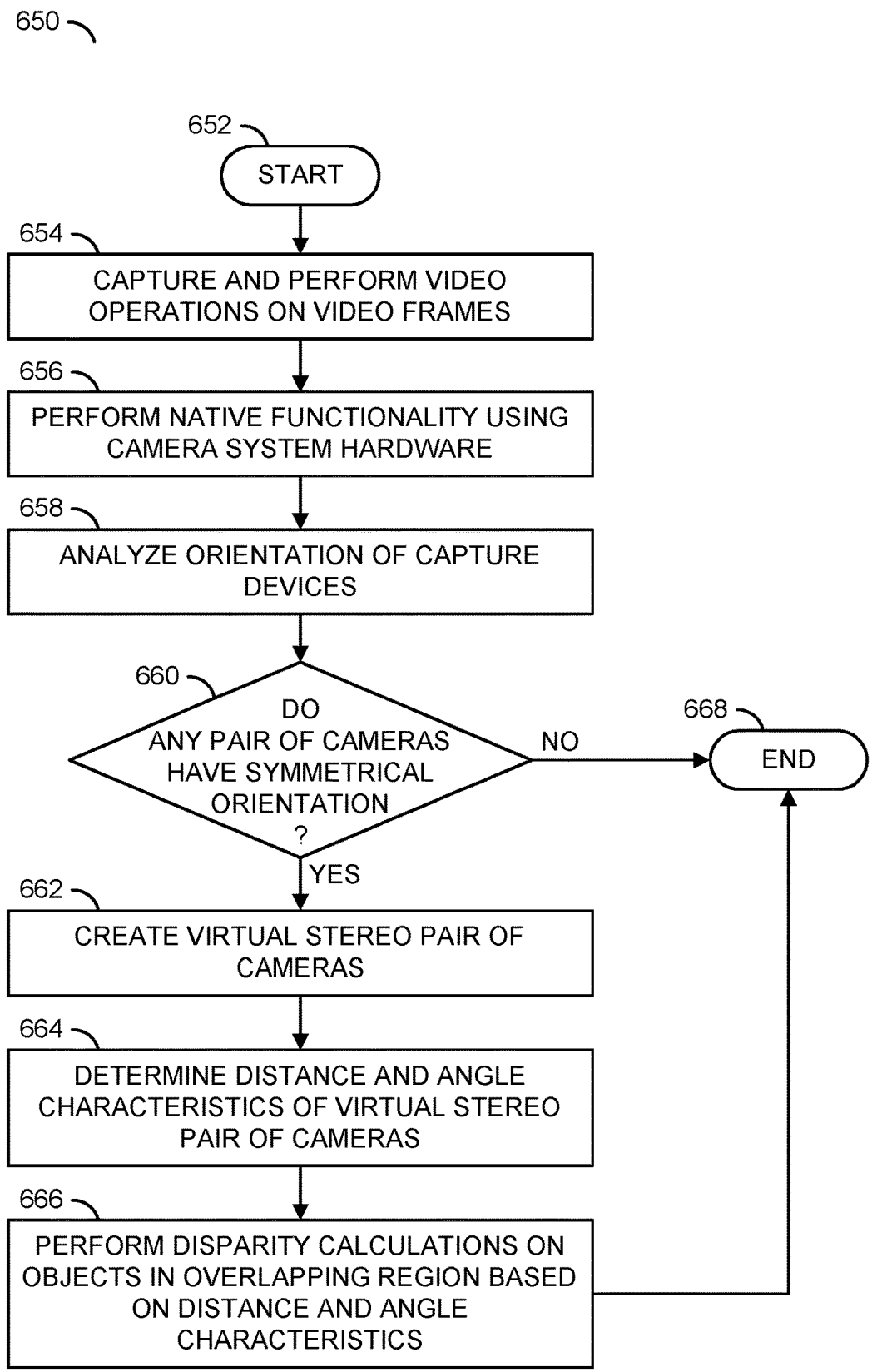
FIG. 12 is a flow diagram illustrating a method for creating a virtual stereo pair of cameras from capture devices having a symmetrical orientation.

Referring to FIG. 12, a method (or process) 650 is shown. The method 650 may create a virtual stereo pair of cameras from capture devices having a symmetrical orientation. The method 650 generally comprises a step (or state) 652, a step (or state) 654, a step (or state) 656, a step (or state) 658, a decision step (or state) 660, a step (or state) 662, a step (or state) 664, a step (or state) 666, and a step (or state) 668.

The step 652 may start the method 650. In the step 654, the capture devices 102a-102n may capture the video frames and the processors 106a-106n may perform the video operations on the captured video frames. In the step 656, the processors 106a-106n, other components of the apparatus 100 and/or other components of the ego vehicle 50 may perform the native functionality by using the hardware of the camera system 100. Next, in the step 658, the processors 106a-106n may analyze an orientation of the capture devices 102a-102n. In one example, the processors 106a-106n may have prior knowledge of the locations of the capture devices 102a-102n in and on the ego vehicle 50. In another example, the processors 106a-106n may perform the video operations to analyze the video frames captured by each of the capture devices 102a-102n to determine whether the captured video frames were captured from two cameras in a symmetrical orientation (e.g., whether there is an appropriate disparity between two views of the same object). Next, the method 650 may move to the decision step 660.

In the decision step 660, the processors 106a-106n may determine whether any pair (e.g., any two) of the capture devices 102a-102n have a symmetrical orientation. In an example, the processors 106a-106n may check whether any two of the capture devices 102a-102n have the same distance (e.g., S1=S2) to the center line 270 of the ego vehicle 50, whether any two of the capture devices 102a-102n have the same distance to one end of the ego vehicle 50 and whether any two of the capture devices 102a-102n are angled inwards towards each other. If none of the capture devices 102a-102n have the symmetrical orientation, then the method 650 may move to the step 668. If there is a pair of capture devices 102a-102n that have the symmetrical orientation, then the method 650 may move to the step 662.

In the step 662, the processors 106a-106n may create a virtual stereo pair of cameras. In an example, the driver side camera 102f and the passenger side camera 102d may be used to form the stereo pair of cameras 102d/102f. When a stereo pair of cameras 102d/102f is created, the processors 106a-106n may analyze the video frames captured by the two capture devices that form the stereo pair (e.g., the capture device 102d and the capture device 102f) as stereo pairs of images. When a stereo pair of cameras 102d/102f is created, the video frames captured by each of the capture devices that form the stereo pair may be operated on by the disparity engine 164. Next, in the step 664, the processors 106a-106n may determine a distance and angle characteristics of the virtual stereo pair of cameras 102d/102f. In one example, the processors 106a-106n may access the prior knowledge of the characteristics of capture devices 102a-102n to determine the characteristics of the capture device 102d with respect to the capture device 102f for the stereo pair of cameras 102d/102f. In another example, the processors 106a-106n may be configured to calibrate the virtual stereo pair of cameras 102d/102f by analyzing the disparity between a known object at a pre-defined distance (e.g., the user may set up a calibration chart/reference at a particular distance from the cameras for calibration). In the step 666, the disparity engine 164 may be configured to perform the disparity calculations (e.g., comparison calculations) on objects located in the overlapping region 258 based on the distance and/or angle characteristics of the stereo pair of cameras 102d/102f. Next, the method 650 may move to the step 668. The step 668 may end the method 650.

The functions performed by the diagrams of FIGS. 1-12 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
    an interface configured to receive (i) first pixel data of a first field of view captured by a first capture device and (ii) second pixel data of a second field of view captured by a second capture device, wherein (a) said first capture device and said second capture device have a symmetrical orientation with respect to a center line dividing a left half and right half of a vehicle and (b) said first field of view and said second field of view have an overlapping region; and
    a processor configured to (i) select said first capture device and said second capture device to operate as a stereo pair of cameras based on said symmetrical orientation, (ii) receive said first pixel data and said second pixel data from said interface, (iii) process said first pixel data arranged as a first plurality of video frames and said second pixel data arranged as a second plurality of video frames, (iv) detect an object located in said overlapping region, (v) perform a comparison operation on said object based on said symmetrical orientation with respect to (a) said first plurality of video frames and (b) said second plurality of video frames and (vi) determine a distance of said object from said vehicle in response to said comparison operation.

2. The apparatus according to claim 1, wherein when said object is closer to said vehicle than said overlapping region, said processor is further configured to (i) perform an analysis of a plurality of video frames and (ii) determine said distance and a relative velocity of said object with respect to said vehicle in response to (a) said analysis and (b) a physical width that was previously measured when said object was in said overlapping region.

3. The apparatus according to claim 1, wherein (i) said first capture device and said second capture device are two of a plurality of capture devices connected to said interface and (ii) said processor is configured to select any two capture devices from said plurality of capture devices to operate as said stereo pair of cameras only if said two capture devices have said symmetrical orientation.

4. The apparatus according to claim 1, wherein said comparison operation is implemented by a disparity hardware engine of said processor.

5. The apparatus according to claim 1, wherein said symmetrical orientation comprises (i) said first capture device located on a driver side of said vehicle, (ii) said second capture device located on a passenger side of said vehicle and (iii) said first capture device and said second capture device both located an equal distance from a rear of said vehicle.

6. The apparatus according to claim 1, wherein at least one of said first plurality of video frames and said second plurality of video frames are also used to generate an output for a display.

7. The apparatus according to claim 6, wherein said display is implemented as an electronic mirror.

8. The apparatus according to claim 1, wherein said stereo pair of cameras is a virtual stereo pair of cameras created by said processor by selecting from a plurality of capture devices implemented by said vehicle.

9. The apparatus according to claim 1, wherein said distance is used by said processor to detect a potential rear collision.

10. The apparatus according to claim 1, wherein said symmetrical orientation comprises (i) said first capture device located on an outermost location of a first side of said vehicle and directed behind said vehicle, (ii) said second capture device located on an outermost location of a second side of said vehicle and directed behind said vehicle, (iii) said first capture device and said second capture device both located an equal distance from a rear of said vehicle and (iv) said overlapping region is located behind said vehicle.

11. The apparatus according to claim 10, wherein (i) said outermost location of said first side of said vehicle is a driver side mirror, (ii) said outermost location of said second side of said vehicle is a passenger side mirror.

12. The apparatus according to claim 11, wherein (i) said first capture device and said second capture device have a native functionality and (ii) selecting said first capture device and said second capture device to operate as said stereo pair of cameras adds a secondary function to said native functionality.

13. An apparatus comprising:
an interface configured to receive (i) first pixel data of a first field of view captured by a first capture device and (ii) second pixel data of a second field of view captured by a second capture device, wherein (a) said first capture device and said second capture device have a symmetrical orientation with respect to a vehicle and (b) said first field of view and said second field of view have an overlapping region; and
a processor configured to (i) select said first capture device and said second capture device to operate as a stereo pair of cameras based on said symmetrical orientation, (ii) receive said first pixel data and said second pixel data from said interface, (iii) process said first pixel data arranged as a first plurality of video frames and said second pixel data arranged as a second plurality of video frames, (iv) detect an object located in said overlapping region, (v) perform a comparison operation on said object based on said symmetrical orientation with respect to (a) said first plurality of video frames and (b) said second plurality of video frames and (vi) determine a distance of said object from said vehicle in response to said comparison operation, wherein when said object is closer to said vehicle than said overlapping region, said processor is further configured to
(i) perform an analysis of a plurality of video frames and
(ii) determine said distance and a relative velocity of said object with respect to said vehicle in response to (a) said analysis and (b) a physical width that was previously measured when said object was in said overlapping region.

14. The apparatus according to claim 13, wherein said overlapping region is located a pre-determined distance from said vehicle.

15. The apparatus according to claim 14, wherein said pre-determined distance is 15 meters behind said vehicle.

16. The apparatus according to claim 14, wherein said processor is further configured to measure said physical width of said object in response to (a) said comparison operation and (b) said pre-determined distance.

17. The apparatus according to claim 13, wherein (i) said plurality of video frames each provide a monocular view and (ii) said processor determines said distance and said relative velocity with more accuracy than using said monocular view alone by using said monocular view with (a) said physical width that was previously measured and (b) learning.

18. The apparatus according to claim 17, wherein said plurality of video frames are (i) said first plurality of video frames or (ii) said second plurality of video frames.

19. The apparatus according to claim 17, wherein said plurality of video frames are captured by a third capture device configured to capture a third field of view.

* * * * *